(12) United States Patent
Motoyama

(10) Patent No.: US 8,150,620 B2
(45) Date of Patent: Apr. 3, 2012

(54) ROUTE SEARCH METHOD AND APPARATUS FOR NAVIGATION SYSTEM UTILIZING MAP DATA OF XML FORMAT

(75) Inventor: Masaki Motoyama, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 282 days.

(21) Appl. No.: 12/386,101

(22) Filed: Apr. 14, 2009

(65) Prior Publication Data

US 2010/0262359 A1 Oct. 14, 2010

(51) Int. Cl.
*G01C 21/26* (2006.01)
(52) U.S. Cl. .......................................... 701/410; 701/468
(58) Field of Classification Search .......... 701/200–202, 701/208–209, 204, 207, 211, 213; 340/990, 340/995.1
See application file for complete search history.

(56) References Cited

U.S. PATENT DOCUMENTS

| | | | |
|---|---|---|---|
| 5,953,722 A | 9/1999 | Lampert et al. | |
| 6,016,485 A * | 1/2000 | Amakawa et al. | 705/400 |
| 6,192,314 B1 * | 2/2001 | Khavakh et al. | 701/209 |
| 7,099,882 B2 | 8/2006 | McDonough | |
| 7,266,560 B2 | 9/2007 | Lampert et al. | |
| 7,437,240 B2 * | 10/2008 | Oumi et al. | 701/209 |
| 7,869,946 B2 * | 1/2011 | Couckuyt et al. | 701/209 |
| 7,890,252 B2 * | 2/2011 | Sekine et al. | 701/202 |
| 2005/0102101 A1 * | 5/2005 | Beesley et al. | 701/209 |
| 2007/0185651 A1 * | 8/2007 | Motoyama et al. | 701/211 |
| 2009/0164111 A1 * | 6/2009 | Hosoi et al. | 701/200 |

* cited by examiner

Primary Examiner — Gerald J. O'Connor
Assistant Examiner — Mark Holcomb
(74) Attorney, Agent, or Firm — Muramatsu & Associates

(57) ABSTRACT

A route search method for a navigation system using the XML map data that is layered based on administrative regions improves efficiency and accuracy of finding an optimum route. The method includes the steps of establishing boundary nodes on boundaries of administrative regions, creating cost information on virtual links that connect the boundary nodes on the administrative regions and physical links on a base layer, selecting candidate virtual links regions by evaluating the cost information, detecting candidate total routes between the start point and destination by connecting the candidate virtual links and other routes, and applying physical links in the base layer to the candidate total routes for further evaluating the costs of the total routes to select the most cost effective total route.

20 Claims, 24 Drawing Sheets

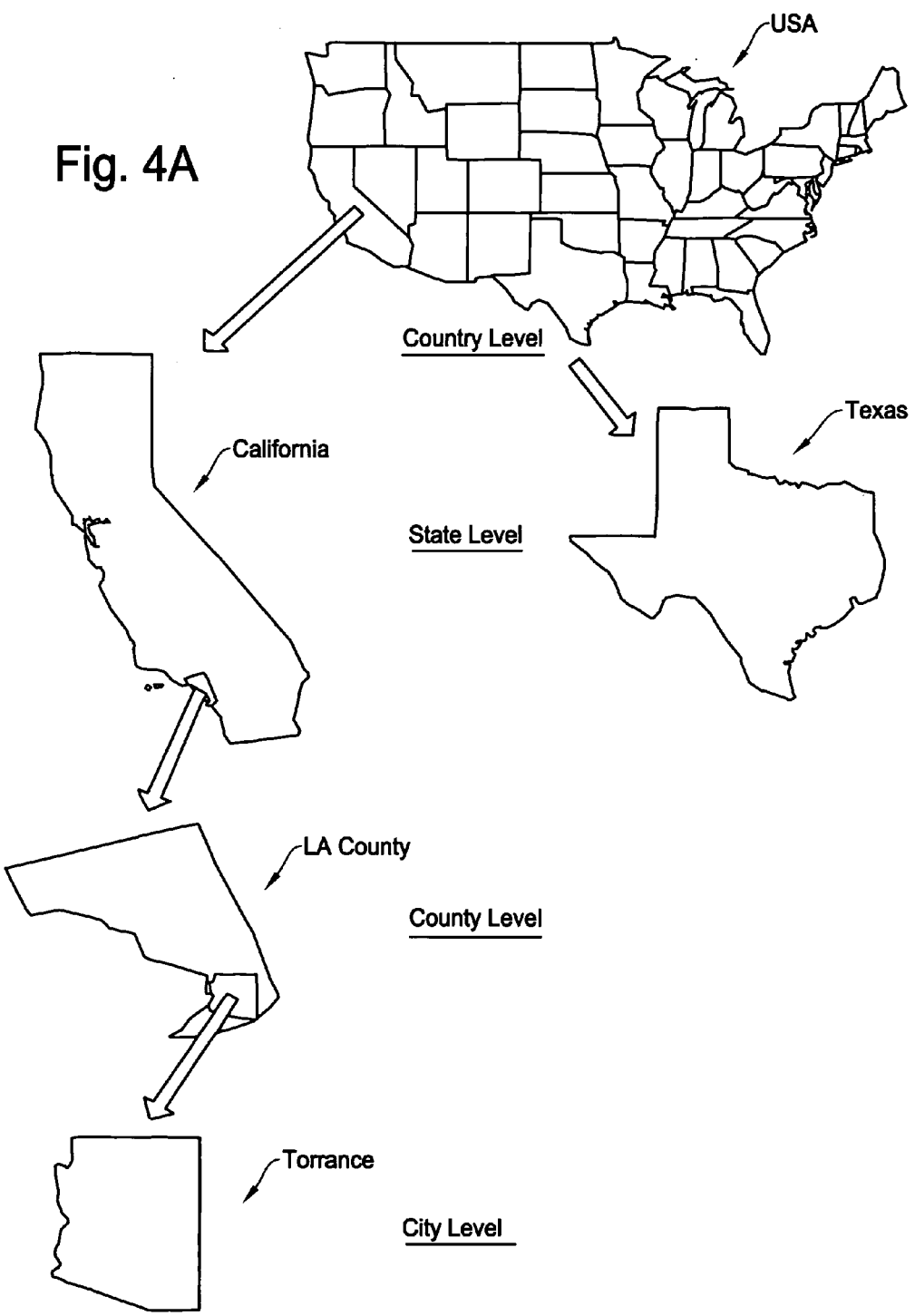

⊣ Local Cluster

○ Boundary Node

△ Local Cluster ····· Shortest Length
○ Boundary Node ─── Shortest Time

Fig. 12C

```
<!DOCTYPE RoutingGraphHierarchy SYSTEM "Database:RoutePlaningXML.db">
<RoutingGraphHierarchy>
 <node name="usa" isMetanode="true" isBoundarynode="true" standard="ISO 3166-1" xlink:href="usaComPath.xml">
  <graphedge source='39799897' target='650095' isBipolar="true" xlink:href="#path34"/>
  <graphedge source='32456436' target='87345233' isBipolar="true" xlink:href="#path31"/>
  <graphedge source='76345629' target='873765' isBipolar="true" xlink:href="#path234"/>
  <graphedge source='2876398' target='9376321' isBipolar="true" xlink:href="#path1"/>
  <graphedge source='5678394' target='243789' isBipolar="true" xlink:href="#path24"/>
  <graphedge source='124389342' target='32765789' isBipolar="true" xlink:href="#path56"/>
  <graphedge source='23876' target='348789' isBipolar="true" xlink:href="#path12"/>
  <graphedge source='98432787' target='4765789' isBipolar="false" xlink:href="#path19"/>
  <graphedge source='4765789' target='98432787' isBipolar="false" xlink:href="#path20"/>
 </node>
</RoutingGraphHierarchy>
```

Fig. 12E

```
<key id="CTL1" for="edge" attr.name="weight" attr.type="dobule">
 <default>1.00000</default>
</key>

<regionNode id="ca" admin="state" name="California" postal="CA"/>
<regionNode id="or" admin="state" name="Oregon" postal="OR"/>
<regionNode id="nv" admin="state" name="Nevada" postal="NV"/>
<regionNode id="ut" admin="state" name="Utah" postal="UT"/>
<regionNode id="az" admin="state" name="Arizona" postal="AZ"/>

<connectionEdge id="e0" admin="state" name="CA-OR" source="ca" target="or" isBipolar="true"/>
<connectionEdge id="e1" admin="state" name="CA-NV" source="ca" target="nv" isBipolar="true"/>
  <data key="CTL1"> 0.32876 </data>
<connectionEdge id="e2" admin="state" name="CA-AZ" source="ca" target="az" isBipolar="true"/>
  <data key="CTL1"> 1.0078 </data>
<connectionEdge id="e3" admin="state" name="AZ-NV" source="az" target="nv" isBipolar="true"/>

<connectionNode id="ca" admin="california" level="1112" code="01">
 <node isBordernode="true" isMetanode="true" xlink:href="state/CA.xml"/>
</connectionNode>
```

Fig. 13

High Level (Virtual Link)

Distance Table

|  | BN-1 | BN-2 | BN-3 | BN-4 | BN-5 |
|---|---|---|---|---|---|
| BN-1 | 0 | $D_{12}$ | $D_{13}$ | $D_{14}$ | $D_{15}$ |
| BN-2 | $D_{21}$ | 0 | $D_{23}$ | $D_{24}$ | $D_{25}$ |
| BN-3 | $D_{31}$ | $D_{32}$ | 0 | $D_{34}$ | $D_{35}$ |
| BN-4 | $D_{41}$ | $D_{42}$ | $D_{43}$ | 0 | $D_{45}$ |
| BN-5 | $D_{51}$ | $D_{52}$ | $D_{53}$ | $D_{54}$ | 0 |

Travel Time Table

|  | BN-1 | BN-2 | BN-3 | BN-4 | BN-5 |
|---|---|---|---|---|---|
| BN-1 | 0 | $T_{12}$ | $T_{13}$ | $T_{14}$ | $T_{15}$ |
| BN-2 | $T_{21}$ | 0 | $T_{23}$ | $T_{24}$ | $T_{25}$ |
| BN-3 | $T_{31}$ | $T_{32}$ | 0 | $T_{34}$ | $T_{35}$ |
| BN-4 | $T_{41}$ | $T_{42}$ | $T_{43}$ | 0 | $T_{45}$ |
| BN-5 | $T_{51}$ | $T_{52}$ | $T_{53}$ | $T_{54}$ | 0 |

Virtual Link Table          $VL_{(from)(to)}$

|  | BN-1 | BN-2 | BN-3 | BN-4 | BN-5 |
|---|---|---|---|---|---|
| BN-1 | 0 | $VL_{12}$ | $VL_{13}$ | $VL_{14}$ | $VL_{15}$ |
| BN-2 | $VL_{21}$ | 0 | $VL_{23}$ | $VL_{24}$ | $VL_{25}$ |
| BN-3 | $VL_{31}$ | $VL_{32}$ | 0 | $VL_{34}$ | $VL_{35}$ |
| BN-4 | $VL_{41}$ | $VL_{42}$ | $VL_{43}$ | 0 | $VL_{45}$ |
| BN-5 | $VL_{51}$ | $VL_{52}$ | $VL_{53}$ | $VL_{54}$ | 0 |

Base Level (Physical Link)

|  | $L_{n+1}$ | $L_{n+4}$ | $L_{n+7}$ | $L_{n+99}$ | $L_{n+1001}$ |
|---|---|---|---|---|---|
| Length | Dm_1 | Dm_4 | Dm_7 | Dm_99 | Dm_1001 |
| Speed | SP_x | SP_y | SP_x | SP_x | SP_xyz |
| Cost space | $CS\alpha$ | $CSf$ | $CS\beta$ | $CS\psi$ | $CS\alpha$ |

Cost Space

| Attribute | Seasonal | Construction | Traffic law | Time | Vehicle T | Toll/Gate | Dynamic Info |
|---|---|---|---|---|---|---|---|
| Component 1 | x-a1 | x-a2 | x-a3 | x-a4 | x-a5 | x-a6 | x-a7 |
| Component 2 | y-a1 | y-a2 | y-a3 | y-a4 | y-a5 | y-a6 | y-a7 |
| Component 3 | z-a1 | z-a2 | z-a3 | z-a4 | z-a5 | z-a6 | z-a7 |
| $CS_{value}$ | c-a1 | c-a2 | c-a3 | c-a4 | c-a5 | c-a6 | c-a7 |

Component 1 = Speed = x
Component 2 = type of area = y
Component 3 = angle, Z-coordinate = z $CS_{value}$ = | x | y | z |
              | Comp-1 | Comp-2 | Comp-3 |
              | 8 bits | 4 bits | 4 bits |

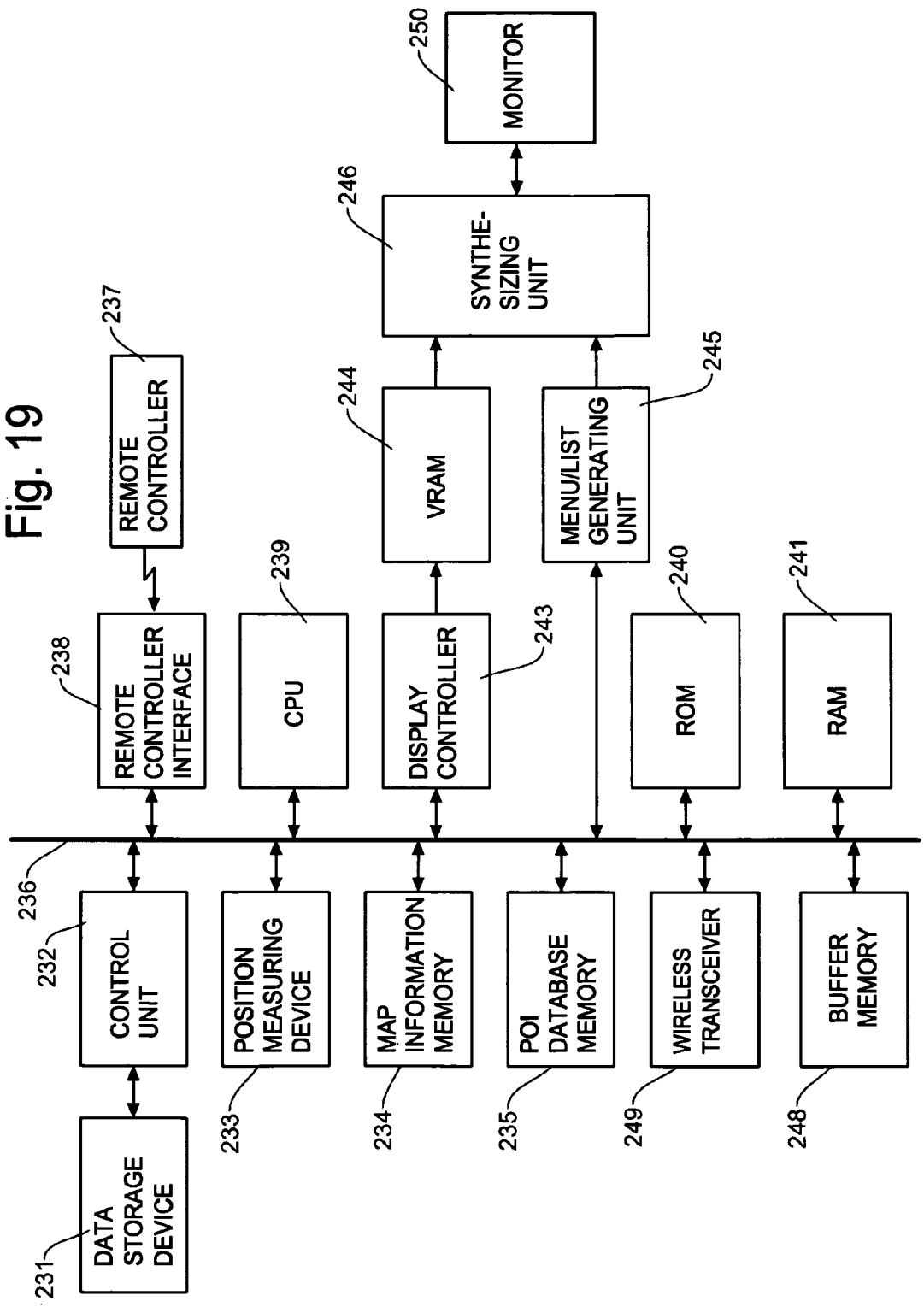

ROUTE SEARCH METHOD AND APPARATUS FOR NAVIGATION SYSTEM UTILIZING MAP DATA OF XML FORMAT

FIELD OF THE INVENTION

This invention relates to a route search method and apparatus utilizing XML format map data, and more particularly, to a route search method and apparatus for a navigation system utilizing XML format map data that is configured by layered clusters of administrative region by connecting boundary nodes of the administration regions.

BACKGROUND OF THE INVENTION

A navigation system performs travel guidance for enabling a user to easily and quickly reach the selected destination. A typical example is a vehicle navigation system which guides a driver of a vehicle to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user' vehicle. At an intersection on the calculated route, the navigation system notifies the user which direction to turn.

FIG. 1 is a schematic diagram showing an example as to how the conventional map data is constructed into mesh structured data for application to a navigation system. In this example of map data, a map area 23 is a graphical representation of a selected area such as a county, a city, etc., that is generated by the original map data provided by a map data provider. Typically, such original map data is in a GDF (Geographic Data File) format which is an interchange file format structure by plain text file. In the mesh structured data of FIG. 1, the map area 23 is divided into a plurality of meshed portions (map cells) 21a-21i each typically having a rectangular shape of a predetermined size.

When a destination is set, a navigation system retrieves and processes the map data to produce a calculated route, which is an appropriate route to the destination determined by pre-defined methods. During a route guidance operation to the destination, the navigation system successively retrieves the map data associated with the calculated route from the data storage medium and stores such map data in a map memory and reads the map data in the map memory for conducting the route guidance operation. The map data for the navigation system must include a vast amount of information such as road shapes, absolute locations, road classes, allowable speeds and other traffic regulations, POI (point of interest) information, POI icons, map icons, etc. Thus, the process of storing and retrieving such a large amount of map data during the route guidance operation can be time consuming and inefficient.

In order to resolve such burdens, the map data used for a navigation system is typically structured in a multiple layer data format. FIG. 2 is a schematic diagram showing an example of such a multiple layer data format of the map data used in the navigation system. As shown, the format of the map data in FIG. 2 is configured by a plurality of layers 11A-11D each representing a part of the map data to be stored in a map data storage or a map database of the navigation system.

Further, as noted above, the map data in each of the layers 11A-11D is divided into a plurality of meshes or map cells represented by reference numerals 13. Namely, the map data is hierarchically layered corresponding to the level of details of the map information as well as divided corresponding to the size or amount of the map data. In the example of FIG. 2, the higher the layer of the hierarchy, the lower the detailedness of the map information and the larger the mesh size which is equivalent to the covering area.

Typically, the higher layer represents only high class roads, for example, interstate highway, freeway, etc. while the lower layer represents low class roads, i.e., residential roads, etc., POI icons, building foot prints, etc., in addition to that represented by the higher layers. One of the reasons for using the layered structure is to accommodate several different map scales for enlarging or shrinking the map image on the display screen on the navigation system. Since the lower layer includes more detailed map information, the size of the mesh 13 (covering area) is smaller than that of the higher layer to maintain the amount of map data within a predetermined range.

In FIG. 2, although the same numerals 15 are used to indicate various roads on the layers, the classes of the roads represented by them are not the same. Namely, the roads 15 in the higher layers represent only the high class roads while the roads 15 in the lower layer includes all the classes of roads of the upper layers and the current layer. Further, as noted above, the map data in each data layer is divided into a plurality of meshes or map cells 13 each having a rectangular shape of a predetermined size.

Since the map data is treated as a unit of mesh (map cell) 13 as shown in FIG. 2, the navigation system does not have to process an excessively large amount of map data at a time. Namely, the navigation system processes the map data corresponding to each unit of the mesh. The layer 11A shown in FIG. 2 is comprised of one mesh 13A while the layer 11B is comprised of four meshes 13B, and the layer 11C is comprised of eight meshes 13C while the layer 11D is comprised of sixteen meshes 13D. Thus, the performance limitation that may be caused by the hardware power of the navigation system can be alleviated by maintaining the map data within the suitable size.

The data format based on the meshed layers described above has disadvantage in that generating and modifying the map data is complex and time-consuming. Moreover, the data format is not logically related to an actual geographic area, i.e., the meshes are not logically related to the actual shape of city or state boundaries. Therefore, it is desired that map data be organized in a more logical and intuitive manner while allowing easy modification, and a search method for such map data be conducted so as to take advantage of the city/state boundary for efficient route searching.

SUMMARY OF THE INVENTION

It is, therefore, an object of the present invention to provide a method and apparatus for searching a route between a start point to a destination for a navigation system utilizing XML map data with a layered structure which is configured by units of administrative regions.

It is another object of the present invention to provide a method and apparatus for efficiently searching a route between the start point and the destination by evaluating costs of virtual links that connect boundary nodes of the administrative regions on higher layers and costs of physical links on a base layer of the map data.

It is a further object of the present invention to provide a method and apparatus for efficiently searching a route between the start point and the destination by evaluating costs of virtual links and physical links where the costs are computed based on distances, travel times, and cost space factors with various attributes.

One aspect of the present invention is a route search method for a navigation system using the XML map data that is layered based on administrative regions. The method includes the steps of: establishing boundary nodes on boundaries of administrative regions represented by the XML map data having a layered structure, creating cost information on virtual links that connect the boundary nodes on the administrative regions on layers higher than a base layer in the layered structure of the XML map data, creating cost information on physical links on the base layer of the layered structure of the XML map data, searching routes between a start point and boundary nodes of an administrative region to which the start point belongs and searching routes between a destination point and boundary nodes of an administrative region to which the destination point belongs, selecting candidate virtual links that connect the boundary nodes of different administrative regions on a particular layer of the map data by evaluating the cost information on the virtual links, detecting candidate total routes between the start point and destination by connecting the candidate virtual links and the routes between the start point and the destination to the boundary nodes of the corresponding administrative regions, and applying physical links in the base layer of the map data to the candidate total routes for further evaluating costs of the total routes to select the most cost effective total route.

The method of searching a route in the present invention further includes a step of repeating the step of selecting the candidate virtual links corresponding to a layer of the XML map data different from said particular layer to detect candidate total routes for detecting the candidate total routes.

In the method of the present invention, the cost information is computed based on a distance, a travel time, and predetermined cost space factors for each virtual link and physical link where the cost information on the virtual links on a particular layer is established on a layer of the map data that is immediately higher than the particular layer and stored in a form of cost tables. In the method of the present invention, the administrative regions include cities, counties, states, and countries in the order of lower layer to higher layer in the layered structure of the XML map data. Further, the boundary nodes on the administrative regions in the XML map data are nodes of physical links establishing roads at the boundaries of the administrative regions.

In the method of the present invention, the layered structure of the XML map data is configured by an international layer for connecting the boundary nodes between two or more countries, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

Alternatively, the layered structure of the XML map data is configured by a freeway backbone layer having physical links and nodes for connecting the freeway to nodes on other layers, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

In the method of the present invention, the predetermined cost space factors for each virtual link and physical link are numerical values assigned to different attributes that affect the costs where the attributes include a season of a year, a time of a day, a structure of a road, traffic law, and a vehicle type. Further, the predetermined cost space factors for each virtual link and physical link are numerical values assigned to different attributes that affect the costs where the attributes include traffic conditions and weather condition related to particular links that change dynamically. The overall cost related to the cost space factors for each virtual link and physical link is determined by averaging the numerical values assigned to different attributes through a root-means-square method.

Another aspect of the present invention is an apparatus for efficiently searching the route for implementing the steps defined in the methods of the present invention noted above. The apparatus includes various means to evaluate virtual links connecting the boundary nodes of administrative regions based on the costs and to select candidate total routes and selects an optimum route to the destination. The apparatus is able to dramatically improve the efficiency and accuracy of calculating an optimum route to the destination for the navigation system using the XML format map data constructed in a layered structure based on administrative areas or jurisdictions.

According to the present invention, the navigation system is able to efficiently search a route between a start point to a destination for a navigation system utilizing XML map data with a layered structure which is configured by units of administrative regions. The navigation system searches a route between the start point and the destination by evaluating costs of virtual links that connect boundary nodes of the administrative regions on higher layers and costs of physical links on a base layer of the map data. The navigation system determines the most cost effective route by evaluating costs of virtual links and physical links where the costs are computed based on distances, travel times, and cost space factors with various attributes.

BRIEF DESCRIPTION OF THE DRAWINGS

FIGS. 4A-4C are schematic diagrams showing the basic concept of the present invention where the layered structure of the XML format map data arranges the map data by clusters of administrative areas where FIG. 4A shows map images of different levels from a country level to a city level, FIG. 4B shows links and nodes of different levels of administrative areas, and FIG. 4C schematically shows the relationship between a freeway backbone layer and other layers.

FIGS. 12A-12E are schematic diagrams showing examples of structure and operation of a multi-layer hierarchy routing system of the present invention which determines an optimum route between a start point and a destination point. FIG. 12A shows a basic concept and structure of the multi-layer hierarchy routing system which evaluates the costs involved in virtual links connecting boundary nodes of the clusters, FIG. 12B shows the operation of the routing system for finding the route in a country level, FIG. 12C is an example of XML descriptions of the route search corresponding to FIG. 12B, FIG. 12D shows the operation of the routing system for finding the route in a state level, and FIG. 12E is an example of XML descriptions of the route search corresponding to FIG. 12D.

FIG. 13 is a schematic diagram showing an example of cost tables with respect to virtual links of a higher level and physical links of a base level for evaluating an overall cost of each candidate route based on distances, speeds, and other factors, thereby determining an optimum route between a start point and a destination point.

FIG. 19 is a block diagram showing an example of structure of a vehicle navigation system for implementing the route search method of the present invention.

DETAILED DESCRIPTION OF THE PREFERRED EMBODIMENT

The route search method of the present invention for a navigation system will be described in more detail with reference to the accompanying drawings. The route search method of the present invention utilizes map data in an extensible markup language (XML) format and a scalable vector graphics (SVG) format converted from general purpose geographic data such as GDF (geographic data file). The map data in the XML/SVG (hereafter "XML" or "XML map data") format for the navigation system is further constructed in a layered structure, i.e., it has a plurality of different data levels, based on administrative areas or jurisdictions. The administrative are or jurisdictions are cities, counties, states, and countries. Within the context of the present invention, such an administrative area will also be referred to as "administrative region", "administrative cluster", or "cluster".

Typically, the map data involved in an administrative cluster includes cost tables of candidate virtual links for connecting boundary nodes of administrative clusters which are lower by one level. For example, the cost tables in the county level map data describe costs of all possible virtual links for connecting the boundary nodes of city levels within the county. The cost tables of each level are used for evaluating an overall cost of each virtual link connecting the boundary nodes based on distances, speeds, and other factors including current traffic condition. The virtual links selected as cost effective are converted to physical links and an overall cost of each physical link is further examined, thereby determining an optimum route to the destination for a navigation operation.

Figure 3:
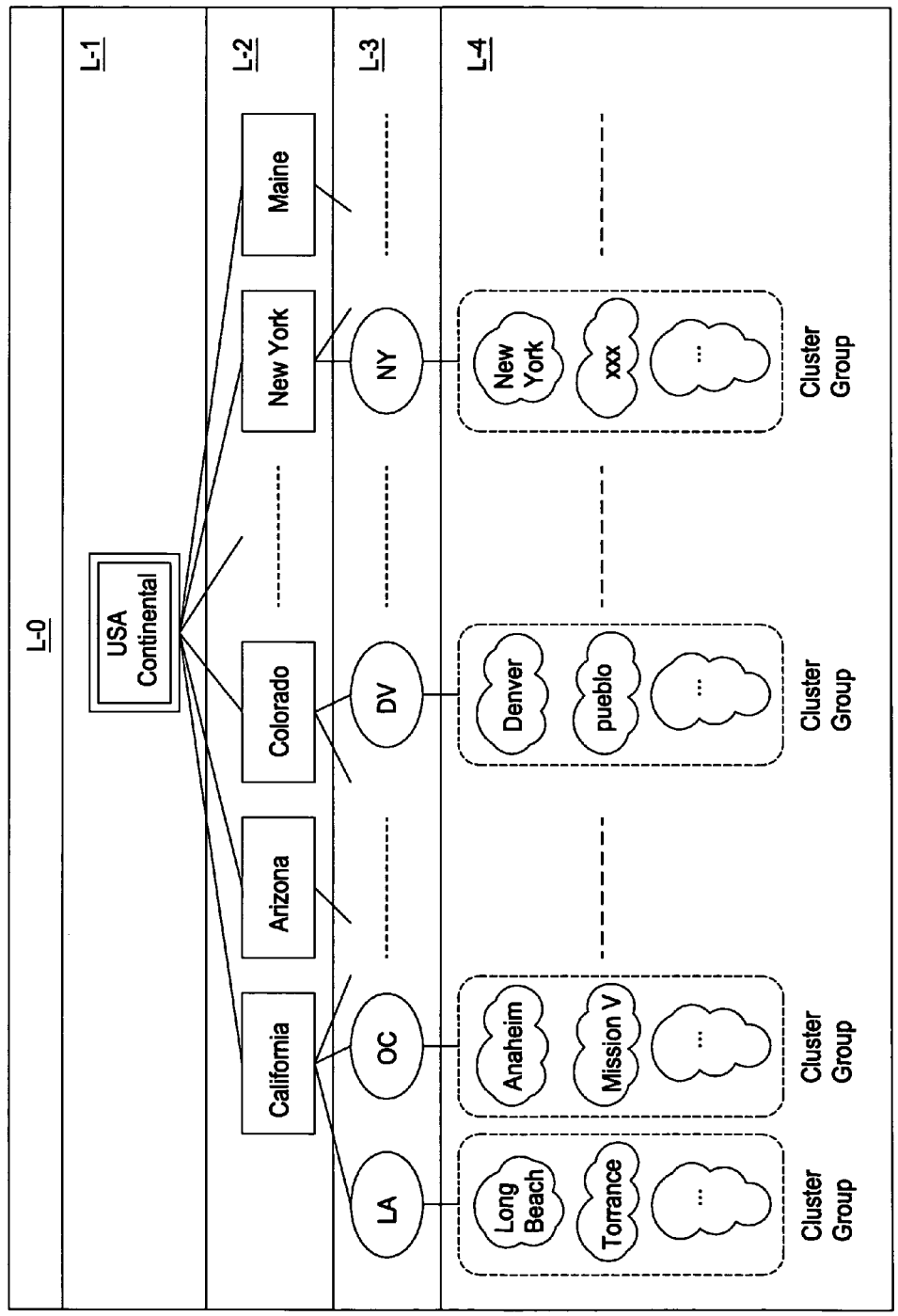
FIG. 3 is a schematic diagram showing a layered structure of the map data of XML format in which the map data is layered based on administrative levels or regions for route search operations under the present invention.

FIG. 3 shows an example of a layered structure of the XML map data incorporated in the route search method of the present invention. In this example, the XML map data is configured by five logical layers (administrative clusters) which are respectively referred to as an L-4 layer, an L-3 layer, an L-2 layer, an L-1 layer, and an L-0 layer. The L-4 layer describes the lowest level (ex. city) of the XML map data, the L-3 layer is the next lowest level (ex. county), the L-0 layer describes the highest level (ex. world or international), the L-1 layer describes the next highest level (ex. country), and the L-2 layer describes the intermediate level (ex. state). The higher the level of administrative cluster, the larger the covered area with less details of routes and other map information.

The L-4 layer which is the lowest layer of the XML map data includes all of the road network data in the physical level for each cluster. As noted above, in the present invention, each cluster is an administrative region which is a city, county, state, and country. Thus, since it is the lowest layer, each cluster in the L-4 layer is organized as a unit of a city or a town with physical links rather than virtual links.

As shown in the example of FIG. 3, the city of "Long Beach" and the city of "Torrance" are illustrated as separate clusters in the layer L-4. In FIG. 3, the cities of "Long Beach", "Torrance", and other cities belong to the county of "Los Angeles", and the cities of "Anaheim", "Mission Viejo" and other cities belong to the county of "Orange". Since the counties are higher than the cities by one in the administrative level, the map data of the counties are on the layer L-3.

As will be described later, each cluster has boundary nodes on a cluster boundary (boundary of administrative region) where such boundary nodes are actual nodes of roads at the boundary of a city, county, etc. The layers higher than the L-4 level has a cost table for evaluating costs of each of virtual links connecting the boundary nodes of two or more clusters in the lower layer. For example, the XML map data in the county level (layer L-3) includes the cost table regarding the virtual links connecting the boundary nodes of two or more cities (layer L-4) within the county for evaluating candidate virtual links.

Thus, the cost table is used to determine an optimum route between a start point and an end point (destination) through the cluster boundary nodes. The cost table is close ended in the XML map data of the corresponding cluster, which allows easy modification for quality improvement or data renewal. The cost tables of each level are used for evaluating an overall cost of each virtual link connecting the boundary nodes based on distances, speeds (ex., road class), and other factors including current traffic condition.

Typically, a plurality of boundary nodes are established on the boundary of the cluster based on the road links and nodes in the map database. For example, in the layer L-4, since each cluster of administrative region represents a city, each city has city boundary nodes. In general, such city boundary nodes are cross points (nodes) of major roads between one city to another city adjacent to one another, i.e., the boundary nodes act as common nodes to the outside cluster.

Since the layer L-4 is the lowest layer, if both of a start point and a destination reside within the same cluster (city), an optimum route will be determined by directly evaluating the XML map data for the city since there is no boundary nodes involved in such a case. In contrast, if a start point and a destination are located in cities (administrative clusters) different from one another, an optimum route will be determined by evaluating virtual links connecting the boundary nodes of the cities. For doing this, the XML map data of the L-3 layer which is an administrative region of county level includes information (cost tables) to manage and evaluates virtual links for city level clusters that are located within the county.

The information in the cost tables is used for route calculation (cost evaluation) involving a route that crosses over two or more administrative clusters (cities), such as "Long Beach", "Torrance", etc., within a given county such as "Los Angeles" county via the boundary nodes on the city boundaries. The county layer L-3 includes boundary nodes on the boundary of each city in the county as well as on the boundary of the county itself which function as common nodes to adjacent counties. In addition to the cost tables for virtual links of city boundary nodes, the L-3 layer may also store cost tables for evaluating the costs of virtual links that directly connect the boundary nodes of the county.

The XML map data of the L-2 layer which is an administrative region of state level includes information (cost tables) to manage county level clusters that are located within the state. The information is used for route calculation (cost evaluation) involving a route that crosses over two or more administrative clusters (counties) such as "Los Angeles", "Orange", etc., within a given state such as "California" via the boundary nodes on the boundaries of such counties. The state level map data in the layer L-2 includes boundary nodes of the counties as well as boundary nodes of the state itself which also function as common nodes to adjacent states. In addition to the cost tables for virtual links of county boundary nodes, the L-2 layer may also store cost tables for evaluating the costs of virtual links that directly connect the state boundary nodes.

The XML map data of the L-1 layer which is an administrative region of country level includes information (cost tables) to manage state level clusters that are located within the country. The information is used for route calculation (cost evaluation) involving a route that crosses over two or more administrative clusters (states) such as California, Arizona, etc., within the country such as the United States of America via the boundary nodes on the boundaries of such states. The country level map data in the layer L-1 includes boundary nodes of the states as well as boundary nodes of the country itself which also function as common nodes to adjacent countries. In addition to the cost tables for virtual links of state boundary nodes, the L-1 layer may also store cost tables for evaluating the costs of virtual links that directly connect the country boundary nodes.

Finally, the XML map data of the L-0 layer which is an administrative region of world level includes information (cost tables) to manage country level clusters that are located in the world. The information is used for route calculation (cost evaluation) involving a route that crosses over two or more administrative clusters (countries) such as United States of America, Canada, Mexico, etc., in the world via the boundary nodes on the boundaries of such countries. The world level map data in the layer L-0 includes boundary nodes of the countries as well as boundary nodes of the world itself.

The number of layers and a category of areas such as city, county or state may vary depending on administrative systems of particular countries. For example, in a certain country, prefecture or province or other municipalities may be used as categories of administrative regions. In principle, as noted above, the higher the layer level, the wider the area covered, and further, the higher the layer level, the smaller the number of such clusters.

Figure 4B:
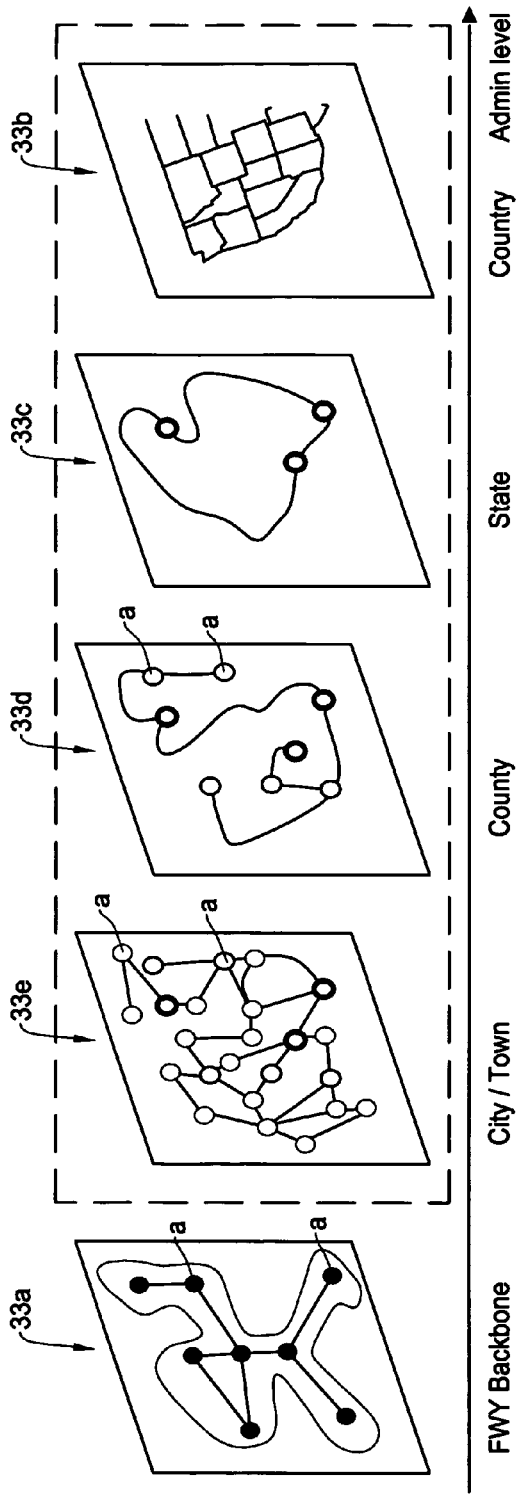
Figure 4C:
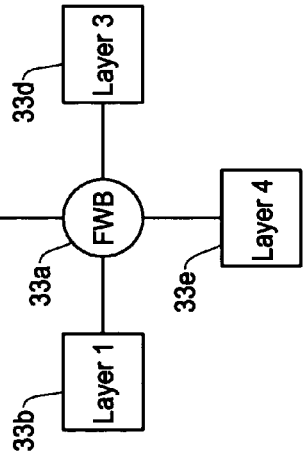

FIGS. 4A-4C are schematic diagrams showing the concept of the present invention where the layered structure of the XML map data arranges the map data by clusters of administrative areas. FIG. 4A shows map images of different levels or layers of administrative areas or regions from a country level to a city level. FIG. 4B are schematic views showing links and nodes of different levels of administrative areas, and FIG. 4C schematically shows the relationship among a freeway backbone layer and other cluster layers.

Figure 1:
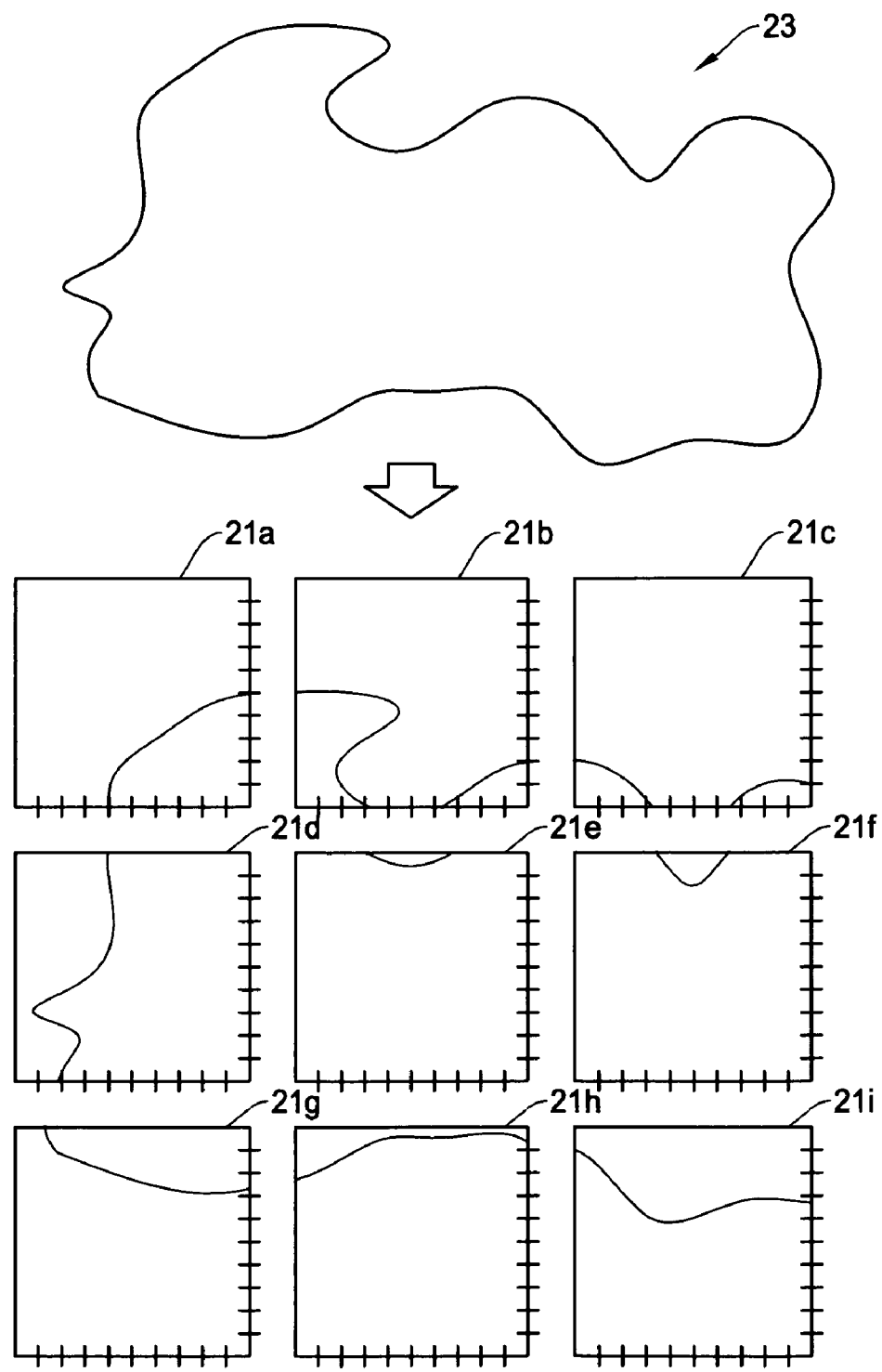
FIG. 1 is a schematic diagram showing a conventional method of utilizing the map data for a navigation system by dividing a selected area into a plurality of rectangular areas or meshes.
Figure 2:
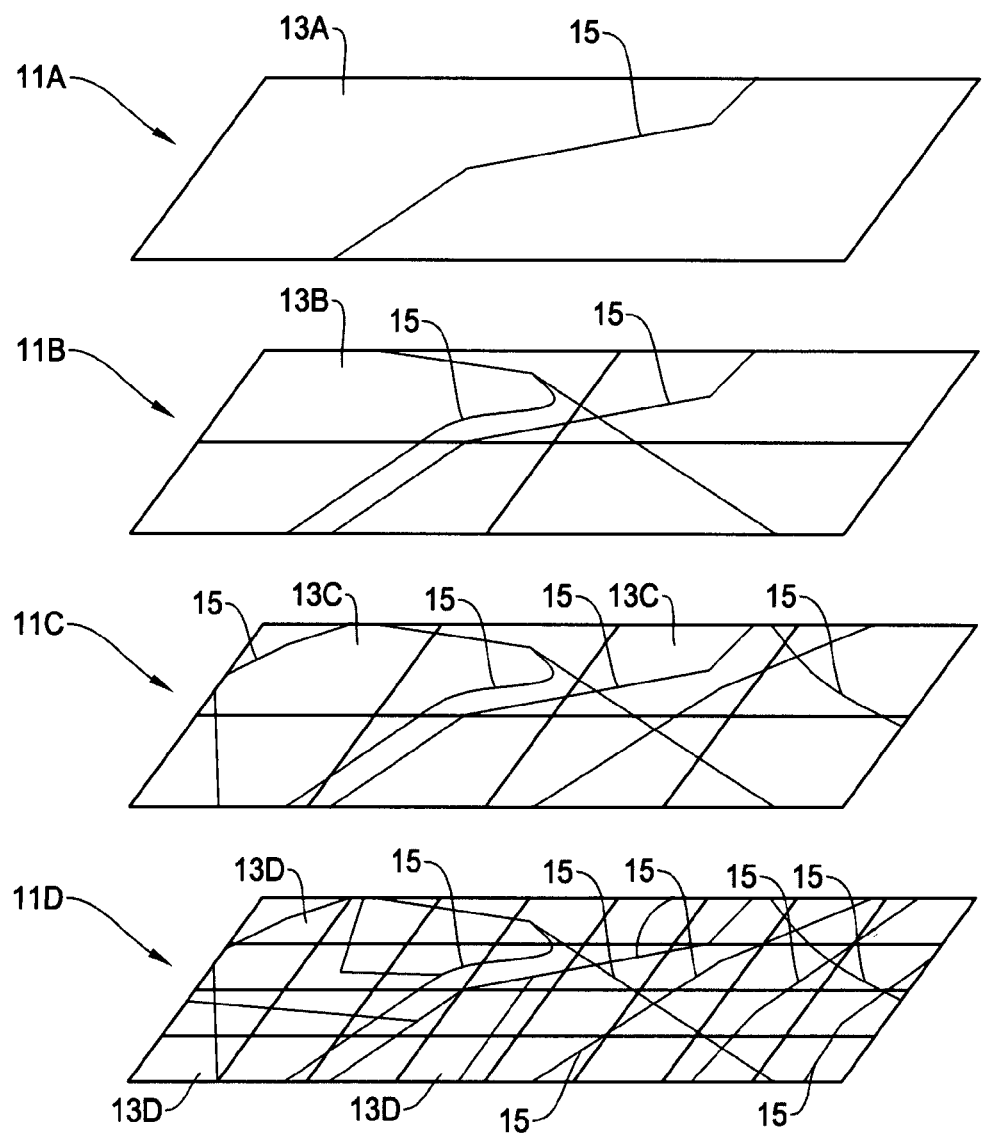
FIG. 2 is a schematic diagram showing an example of multiple layer format of the map data used in the navigation system which includes a plurality of data layers where each data layer is configured by data divided in the form of meshes, roads of various classes, road links, nodes, etc.

FIG. 4A is a basic graphic representation of the data layers under the present invention where the layered structure of the XML map data organizes the map data by jurisdictional clusters (administrative regions). In the conventional technology, as shown in FIG. 1, the map data of the selected area is divided into a plurality of map cells or meshes. In the present invention, however, the XML map data is constructed in a layered structure which is based on administrative areas or regions such as states, counties, and cities.

In the example of FIG. 4A, the highest layer of the XML map data is assigned to an overall country, the United States of America (L-1 layer of FIG. 3), the second highest layer is assigned to states (L-2 layer of FIG. 3). Further, the next layer is assigned to counties (L-3 layer of FIG. 3), and the lowest layer is assigned to cities (L-4 layer of FIG. 3). The L-0 layer of FIG. 3 representing a part or an entire world is not shown in the example of FIG. 4A.

FIG. 4B schematically shows an example of links and nodes of different levels of administrative regions where, in addition to the cluster layers of administrative regions, a freeway backbone layer is provided. Namely, the XML map data of FIG. 4B is configured by a freeway backbone layer 33a, a layer 33b which represents a country having a plurality of states, a layer 33c which represents a state having a plurality of counties, a layer 33d which represents a county having a plurality of cities, and a layer 33e which represents a city or a town. In this example, the layer 33b is the highest layer that covers an overall area of the country.

Further, in this example, the freeway backbone layer 33a with freeway physical links and nodes is provided in addition to the layers of administrative clusters. Freeways are typically used for traveling a long distance such as interstate travel as well as relatively short trip. Due to its extensive coverage throughout the country and frequency of use in travels of long or short distances, in this embodiment, the freeways may be represented as the freeway backbone layer 33a so that this layer may be used in combination with any other layers in a manner as shown in FIG. 4C via the physical links and nodes of the freeway backbone layer 33a.

Each freeway in the freeway backbone layer 33a has a plurality of nodes "a" which most commonly are entry and exit points of the freeway. Since such entry and exit points of the freeway are connected to roads in a city or town level layer, the transfer between the map data layers (administrative clusters) can be facilitated with use of the freeway backbone layer. For instance, one node of the freeway backbone layer 33a may be used to move up or down different levels of map data, for example, between the city layer 33e to the state layer 33c. Likewise, it is possible to move up or down between the county layer 33d to the state layer 33c through the physical nodes on the freeway backbone layer 33a.

Figure 5:
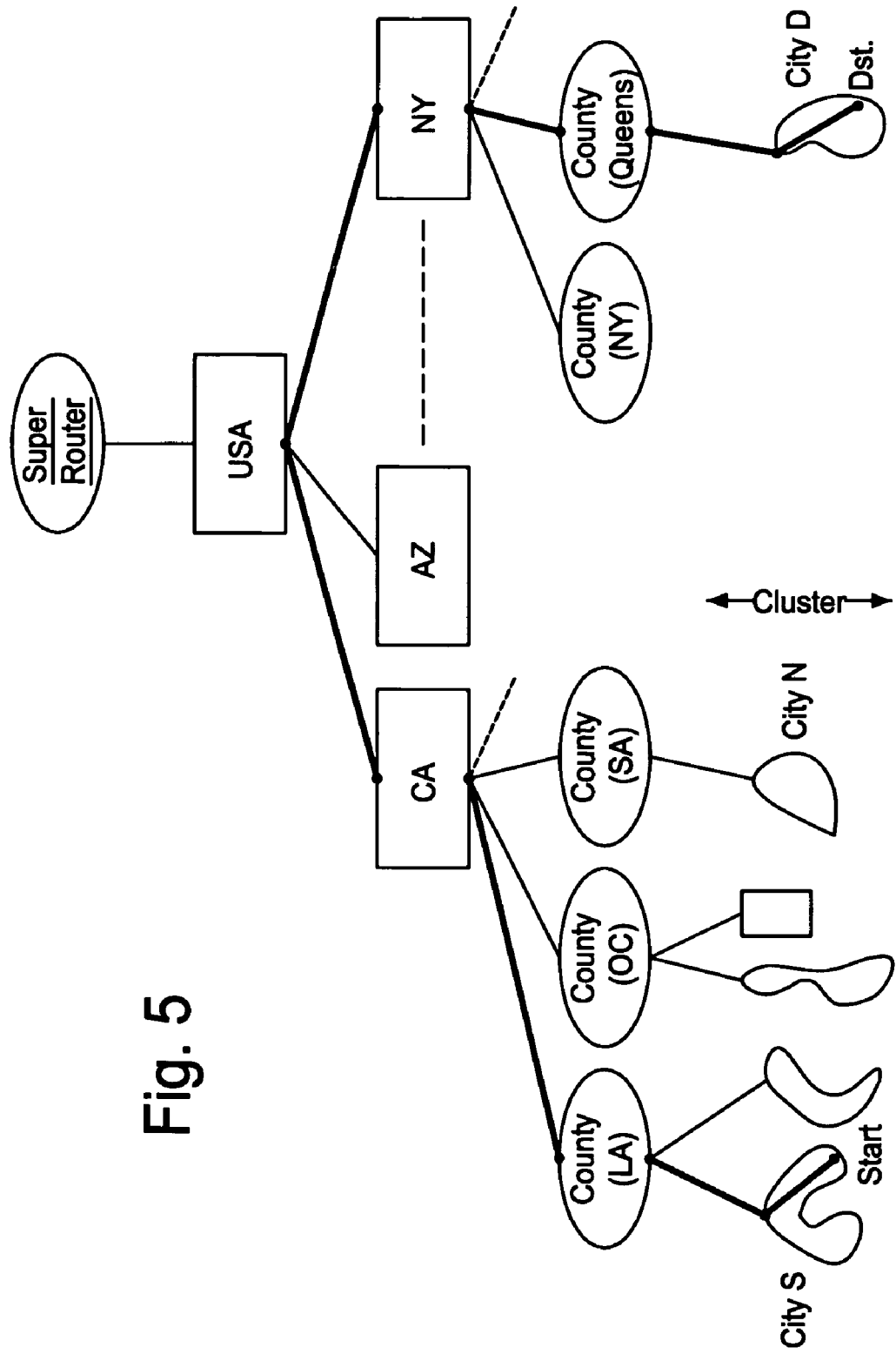
FIG. 5 is a schematic diagram which describes the data structure used for the route search method under the present invention where the data structure includes administrative clusters of different level to show how the route is detected between the start point and the destination point.

FIG. 5 is a schematic diagram which describes the data structure used for the route search method under the present invention where the data structure includes administrative clusters of different level to show how the route is detected between the start point and the destination point. As shown, the data is represented in a tree structure where the highest cluster represents a country (USA) and the lowest clusters represent cities. Under the country cluster level is a state cluster level which is, for example, California or New York where each state has county clusters. In this example, a start point is located in a city cluster S and a destination point is located in a city cluster D. The route search and calculation can be performed by evaluating the costs from one cluster to another cluster via the cluster boundary nodes, and the boundary nodes of the cluster S to the start point and the boundary nodes of the cluster D to the destination point.

Namely, when a route search is to be performed, the route search method under the present invention will first determine the connection from the start point to a boundary node of the city (cluster S) wherein the start point is located. Then, the route (virtual link) from the city boundary nodes to the county boundary nodes is determined, which in this case is Los Angeles county. From the boundary nodes of the Los Angles county, the connection (virtual link) to the boundary nodes of a California state boundary is determined.

The route search is able to find optimum connection between the state of California and New York by evaluating various costs of virtual links connecting the boundary nodes. Similarly, the route between the New York to Queens county, the route between the Queens county and the city D will be determined. Finally, the route search method determines the connection between the boundary node of the city (cluster D) to the destination point.

Typically, in an actual application, the route search is made from both ends (start point and destination) to the opposite directions. Thus, the search for the connection between the destination point and the boundary node of the city (cluster D) can be made at the same time with the search for the connection between the start point and the boundary node of the city (cluster S). The route search method in the present invention is implemented by connecting the boundary nodes in the cost effective way as will be explained in more detail with reference to FIGS. 12A-12E, 13, 14 and 15.

Figure 6:
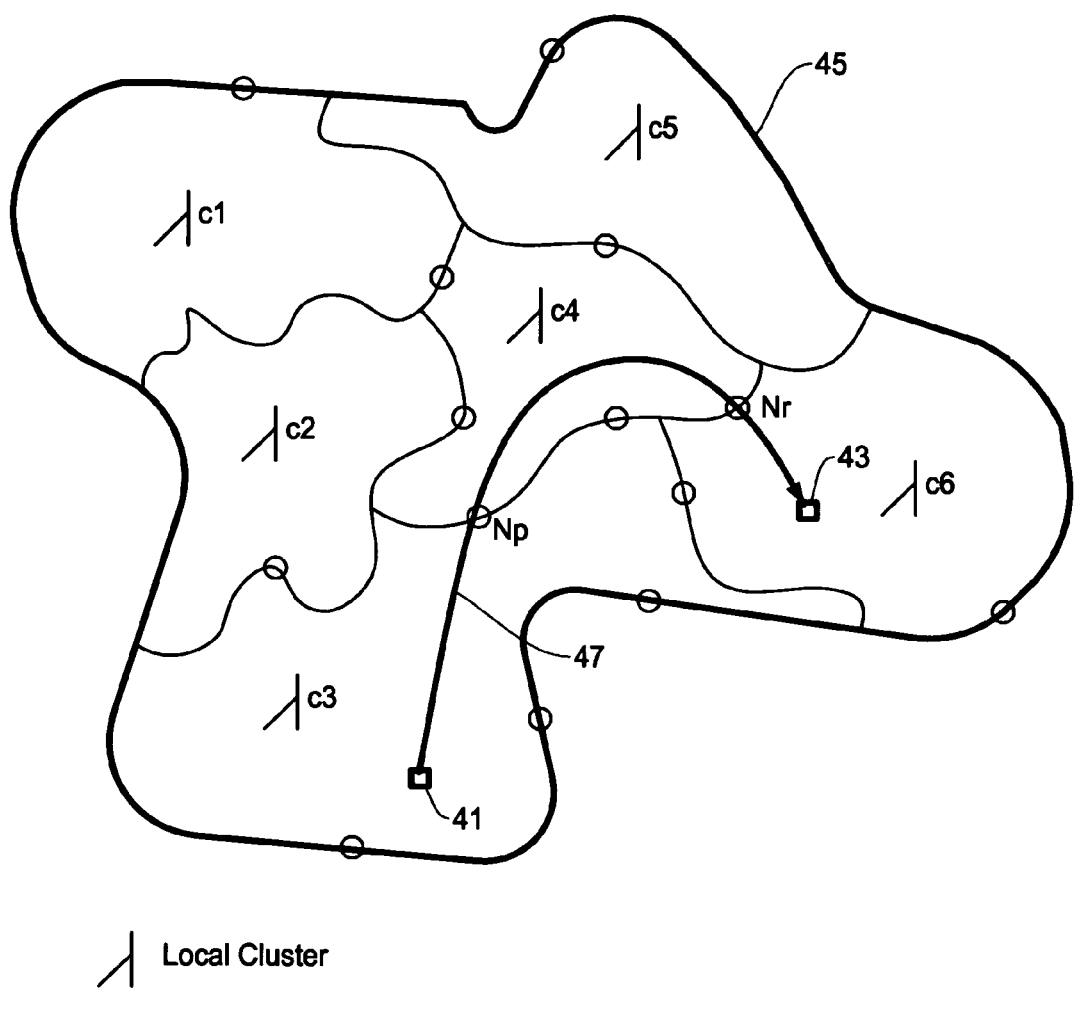
FIG. 6 is a schematic diagram showing an example of concept of the present invention as to how the boundary nodes are used for a route search operation with respect to a plurality of administrative clusters and how the route search method can be applied for obtaining an optimum route.

FIG. 6 is a schematic diagram showing an example of map image that describes how the boundary nodes are used for cross-cluster route search and how the route search under the present invention can be advantageously utilized. In FIG. 6, a higher cluster 45 which may be an administrative region of county is indicated by a thick boundary line. Within the higher level cluster 45, local clusters which may be administrative regions of city numbered from c1 to c6 are located.

In FIG. 6, a start point 41 exists within the local cluster c3 and a destination point 43 exists within the local cluster c6. In this manner, when a route is to be determined where the destination point is located in a different cluster from the cluster where the start point exists, the boundary nodes are used to obtain an optimum route between the start and destination points. In the present invention, the higher cluster 45 has information (cost tables) to allow the navigation system to evaluate virtual links connecting the boundary nodes of the local clusters c1 to c6.

Thus, the navigation system determines which virtual links connecting between the boundary nodes are better suited for an optimum route. The cost tables in the higher cluster 45 are used for evaluating an overall cost of each virtual link connecting the boundary nodes of the clusters c1-c6 based on distances, speeds, and other factors including current traffic condition. The one or more virtual links selected as cost effective are converted to physical roads and links for which the overall costs are further examined and compared, thereby determining an optimum route between the start point and the destination point for a route guidance operation.

When a conventional route search method, such as an A* algorithm, is used to calculate a route from the start point 41 to the destination point 43, a route that goes through only the local clusters c3 and c6 is likely to be established. However, the higher cluster that stores cost tables of virtual links from the local cluster c3 to the local cluster c6 may have information indicating that an optimum route from the cluster c3 to the cluster c6 is achieved by going through the local cluster c4. Thus, the route search method under the present invention is able to find an optimum route with higher quality or accuracy indicated by the calculated route 47.

Because the higher cluster 45 has information (cost tables) to manage lower (local) clusters c1-c6, the route search method under the present invention is able to specify which clusters must be incorporated in the route calculation. The method of the present invention can also specify boundary nodes of the clusters to be used for the calculated route. As a result, an optimum route calculation can be achieved in a short period of time by minimizing the amount of data to be retrieved and processed for calculating the route.

Figure 7:
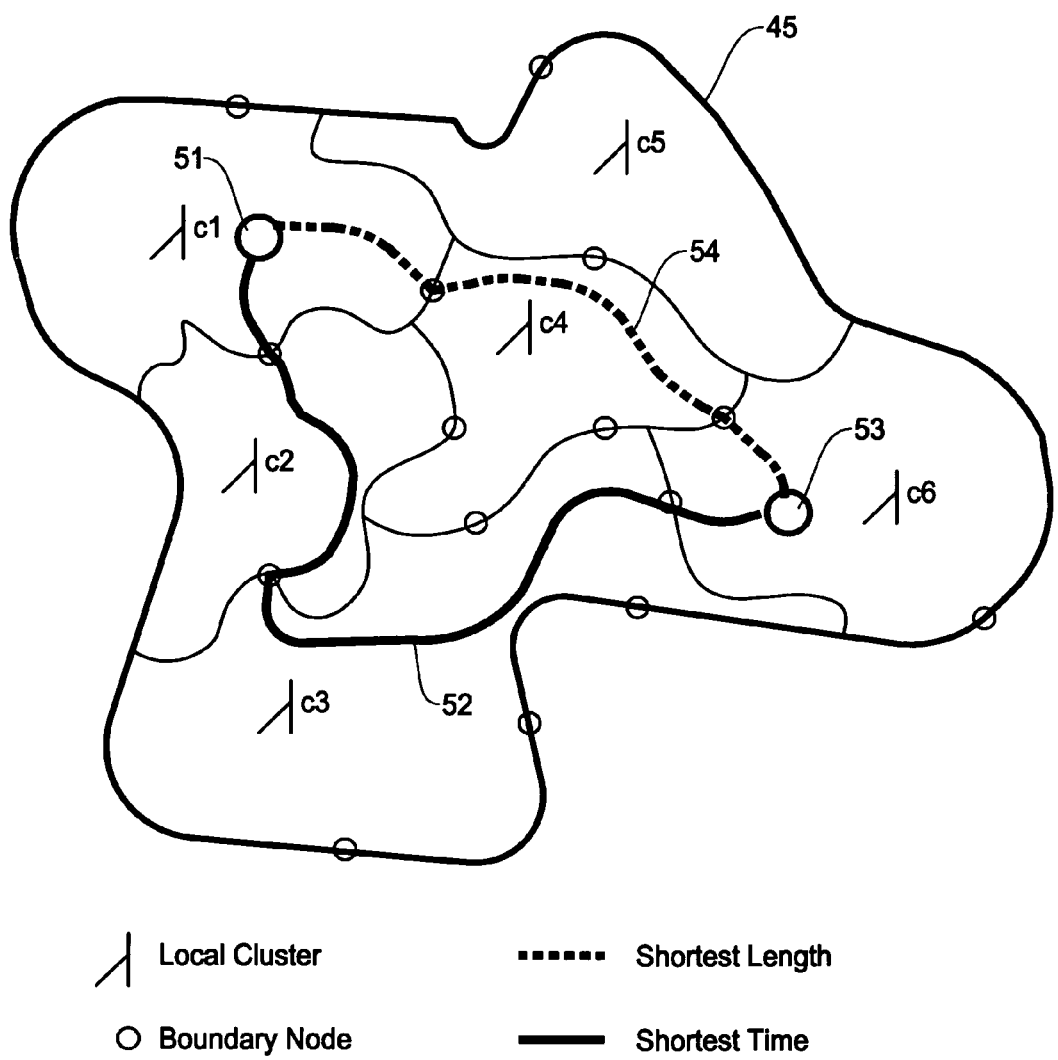
FIG. 7 is a schematic diagram showing an example of concept of the present invention where different routes may be derived from a start point to a destination point where criteria for evaluation of routes are based on distances or lengths between nodes and estimated time of travel or estimated speed on the route.

The information regarding the costs between the boundary nodes may include values based on distances, estimated travel times (estimated speed), and various factors (which will be referred to as "cost space" and will be described in detail with reference to FIG. 15). FIG. 7 is a schematic diagram showing a difference of routes that may be established from a start point to a destination point where the criteria are based on a distance (length) and an estimated travel time (estimated speed on the route). A higher cluster 45 which may be an administrative region of county is indicated by a thick boundary line and within the higher cluster 45, local clusters which may be administrative regions of city numbered from c1 to c6 are located.

In the example of FIG. 7, a start point 51 is located in the local cluster c1 and a destination point 53 is located in the local cluster c6. As described above, the route search will determine the cost from the start point 51 to the boundary nodes of the cluster c1 as well as from the destination point to the boundary nodes of the cluster c6. In this example of FIG. 7, during the route search process, the navigation system prioritizes the cost based on either the distance or the estimated travel time.

In FIG. 7, a route 54 represented by the dotted line indicates a route that is calculated based on the distance criterion as the highest factor of cost. A route 52 represented by the solid line indicates a route that is calculated based on the estimated travel time as the highest factor of cost. Although the schematic view of FIG. 7 describes a simple situation where the route does not involve a node search operation in the higher layers, this principle may be applicable to a more complex route involving cross county (inter county) routes or cross state (interstate) routes.

Referring to the schematic diagram of FIG. 8, descriptions will be made regarding the relationship among the start point, destination point, cluster boundaries and boundary nodes incorporated in the present invention. A start point 71 is located in the cluster 61 and a destination point 73 is located in the cluster 63 where the cluster 61 and the cluster 63 are physically separated from one another. Boundary nodes represented by circles are located on the boundary of each of the clusters 61 and 63.

In finding a route from the start point 71 to the destination point 73, the cost from the start point 71 to the boundary nodes of the cluster 61 and the cost from the boundary nodes of the cluster 63 to the destination point 73 are determined. Suppose the clusters 61 and 63 are administrative regions of city, such costs will be calculated based on the map data of each administrative region since the city level is the lowest. Then, the costs (cross region cost) between the boundary nodes of the cluster 61 and boundary nodes of the cluster 63 are determined for the candidate virtual links.

Figure 8:
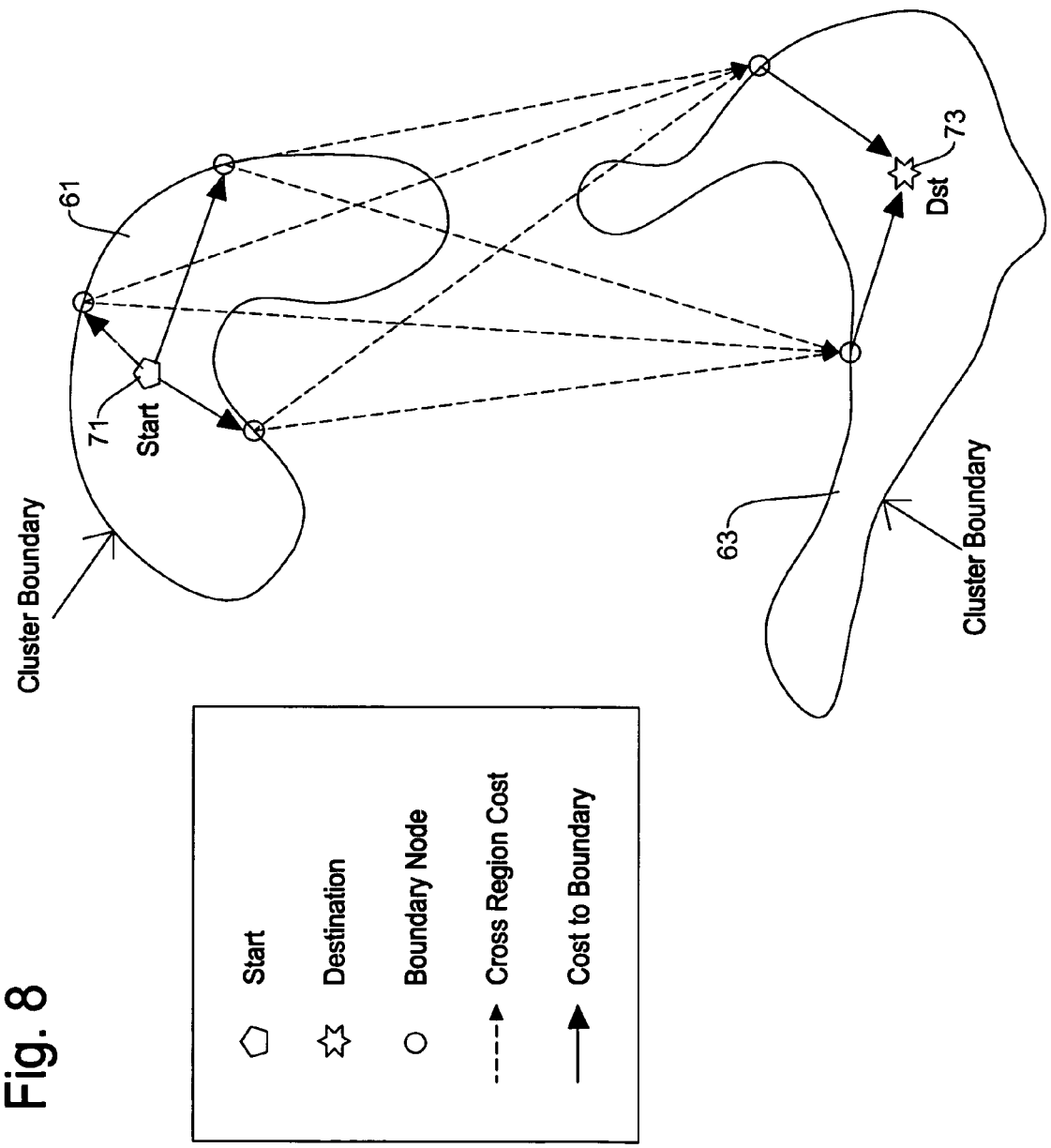
FIG. 8 is a schematic diagram showing various virtual links or costs that are possible to connect between the start point and the destination point which are located in different clusters via boundary nodes of the clusters where each cluster indicates a unit of administrative region.

In FIG. 8, cross region costs are represented by dotted lines which are costs of virtual links that connect the boundary nodes between different administrative regions (clusters 61 and 63). In searching for the route from the start point 71 to the destination point 73, the cross region costs shown by the dotted lines are compared from one another to determine an optimum route. As noted above, the majority of such cross region costs (virtual links costs) are pre-established in the cost table of higher layer. The final cost will be completed by incorporating the costs of physical links as well as the cost space such as traffic conditions, road structure, vehicle type, traffic law, seasonal factor, time of day, etc.

Depending on the locations of the clusters 61 and 63, the cross region cost may involve calculation of nodes in a higher layer. For example, if the cluster (city) wherein the start point is located and the cluster (city) wherein the destination point is located are in different counties, the evaluation of cross region cost will require costs of virtual links that connect boundary nodes between such different counties. In the present invention, the cost table in the state level of the map data includes the information on the costs of virtual links connecting the boundary nodes of county level.

Figure 9:
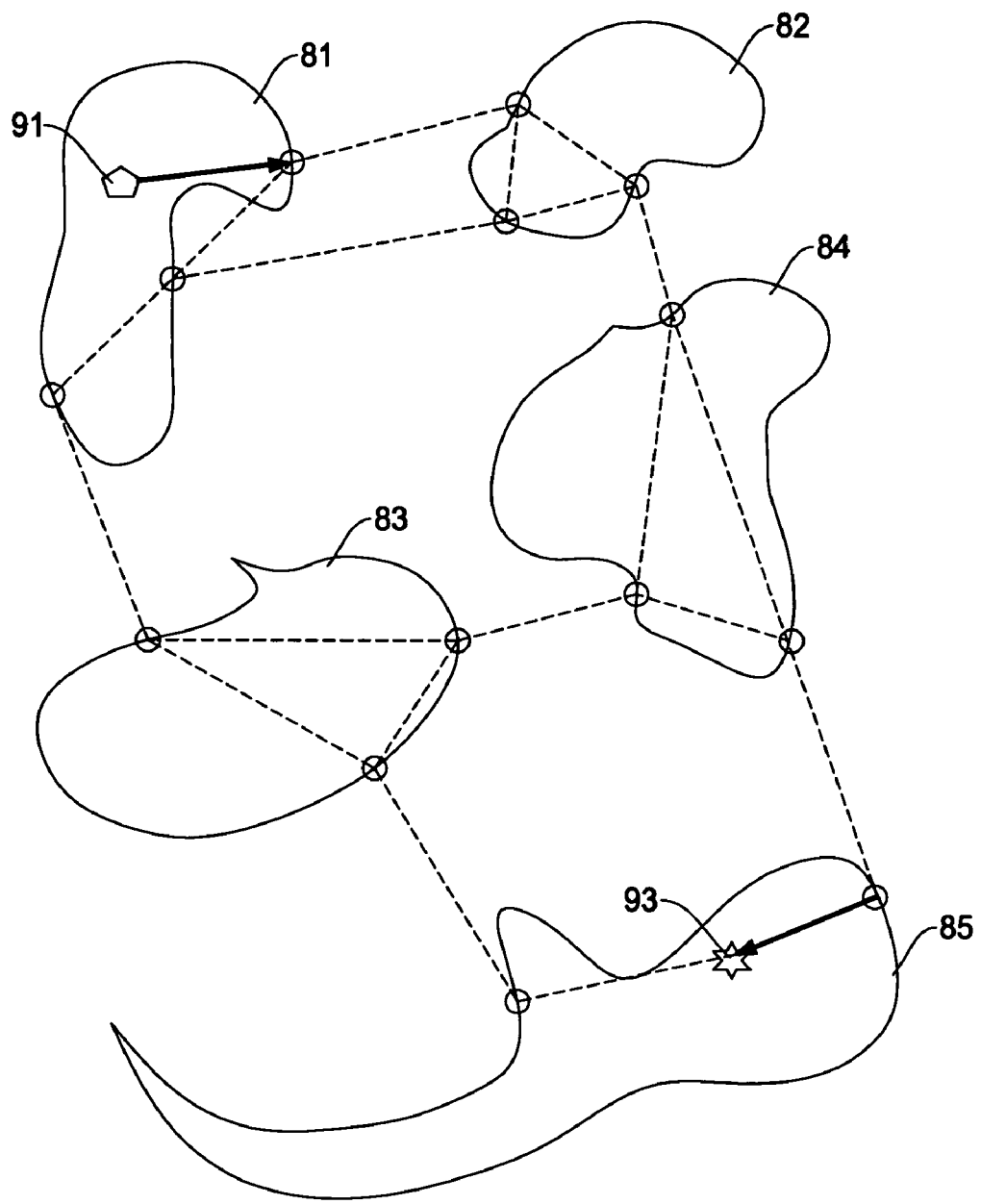
FIG. 9 is a schematic diagram showing a start point, a destination point, several clusters of administrative regions separated from one another, boundary nodes on the clusters, and virtual links that connect the start point and the destination point via the boundary nodes.

FIG. 9 is a schematic diagram showing a start point, a destination point, several clusters of administrative regions separated from one another, boundary nodes on the clusters, and virtual links that connect the start point and the destination point via the boundary nodes. The map image of FIG. 9 includes a start point 91, a destination point 93, clusters 81-85, boundary nodes represented by circles, and connections (virtual links) between the boundary nodes. The route search method under the present invention compares the various candidate virtual links to determine the optimum route based on the values in the cost table in the higher layer map data.

Figure 10:
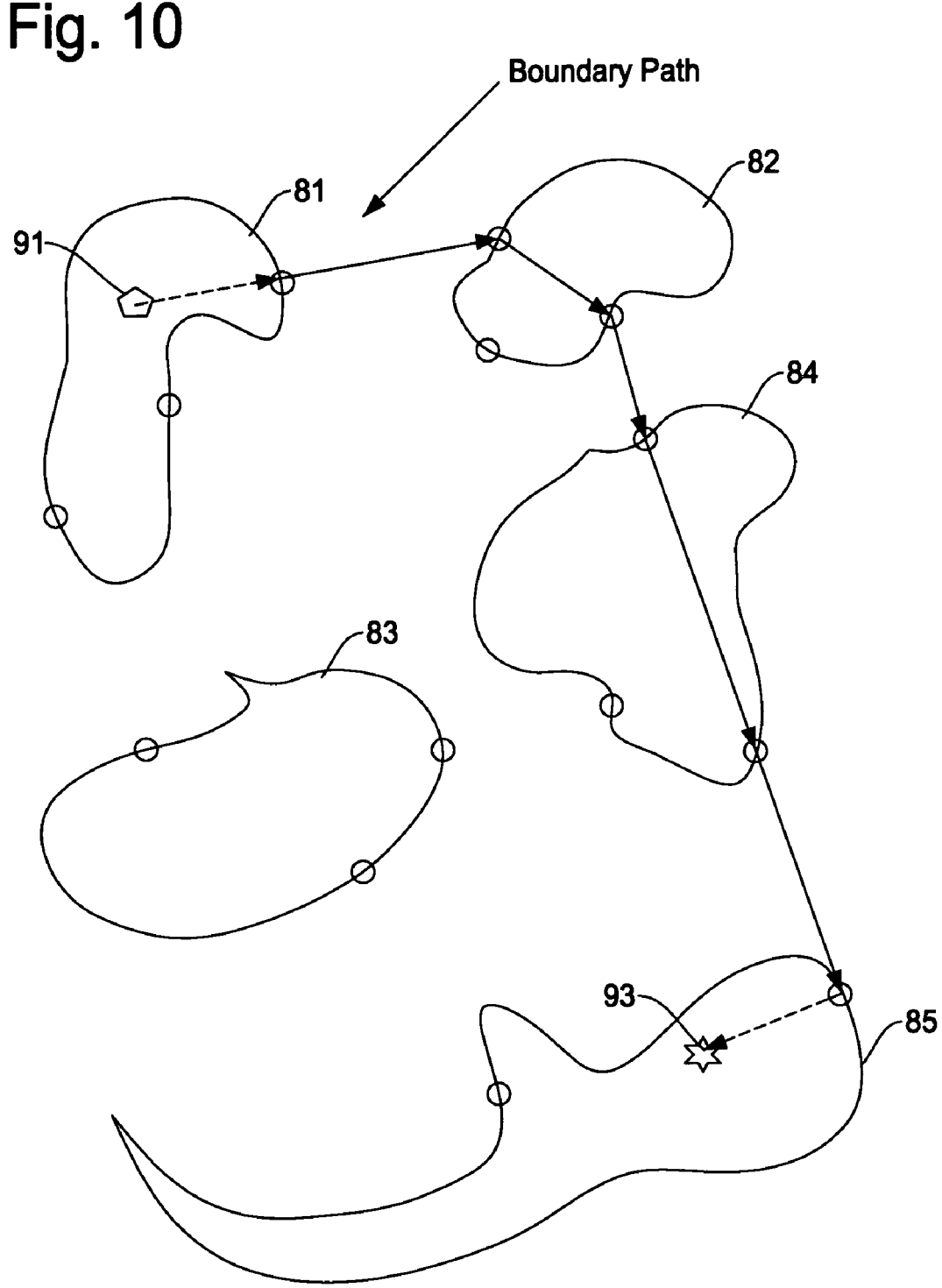
FIG. 10 is a schematic diagram showing the condition where the route search method under the present invention has narrowed down the candidate virtual links connecting the boundary nodes to establish an overall route between the start point and the destination point in the situation identical to that of FIG. 9.

FIG. 10 is a schematic diagram showing the condition where the route search method under the present invention has narrowed down the candidate virtual links connecting the boundary nodes to establish an overall route between the start point and the destination point in the situation identical to that of FIG. 9.

In addition to the virtual links connecting the boundary nodes of clusters, the route includes the connection from the start point 91 to the boundary node of the cluster 81 and the connection from the boundary node of the cluster 85 to the destination point 93. Although this example shows that each connection or virtual link between the two boundary nodes is a straight line for illustration purpose, in an actual application, these virtual links are converted to physical links which are not necessarily straight lines and their costs are further evaluated to attain an final route between the start point and the destination.

Figure 11:
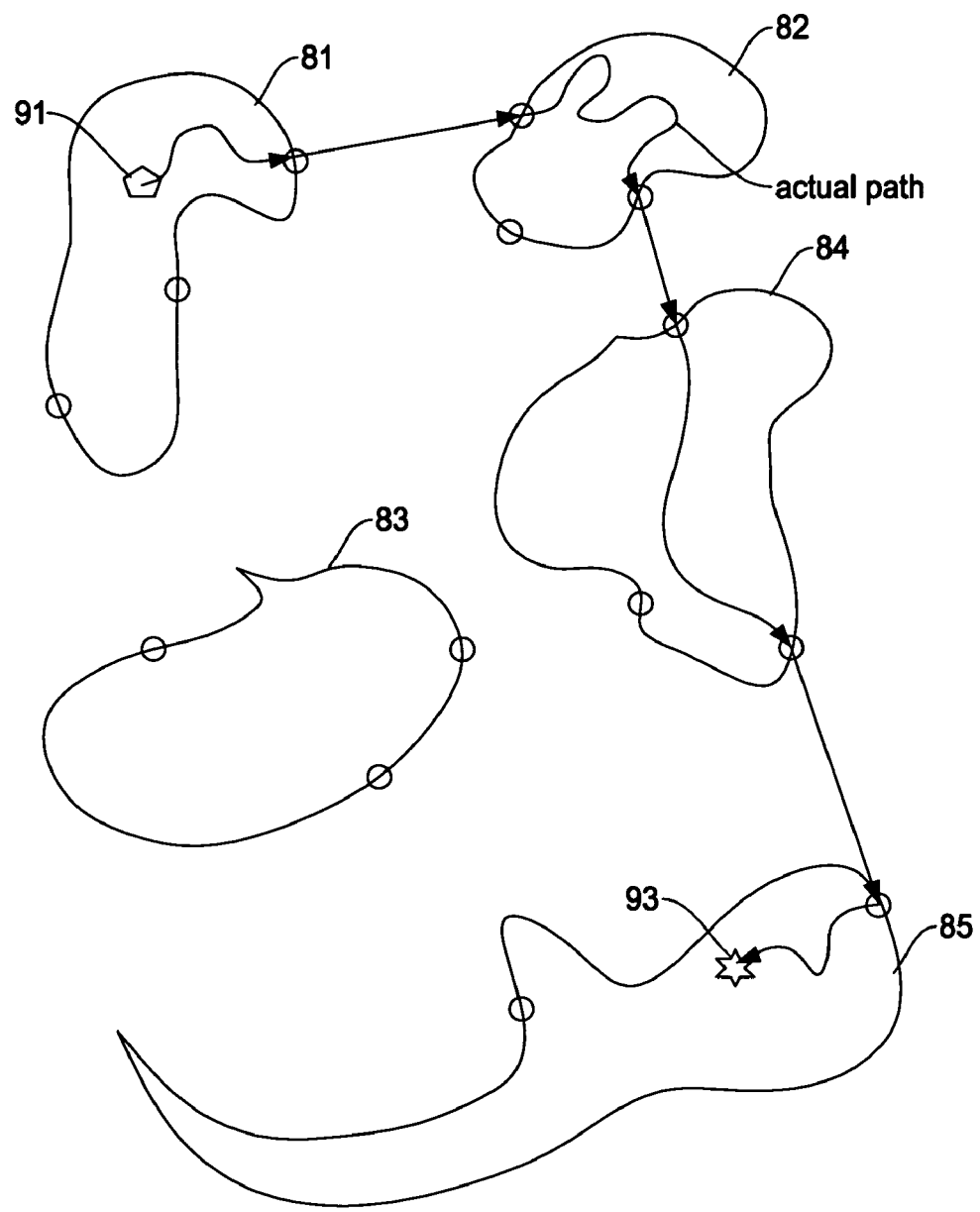
FIG. 11 is a schematic diagram related to the situation similar to that of FIGS. 9 and 10 except that actual routes are illustrated rather than the virtual links for the overall route between the start point and the destination point established the process of FIG. 10.

FIG. 11 is a schematic diagram related to the situation similar to that of FIGS. 9 and 10 except that actual routes are illustrated rather than the virtual links for the overall route between the start point and the destination point established in FIG. 10. In the present invention, the cost tables showing the values indicating the costs of various virtual links are created based on the actual routes rather than the straight lines. Further, the candidate virtual links are eventually converted to physical links of base level, thus, the cost evaluation based on virtual links does not cause inconsistency between the costs of actual routes. Further, the cost evaluation of the present invention further incorporates the cost space which incorporates various factors other than distance and time as will be described in detail with reference to FIG. 15.

FIGS. 12A-12E are schematic diagrams showing a structure and operation of a multi-layer hierarchy routing system of the present invention which evaluates the costs involved in the virtual links used in a route search process. The multi-layer hierarchy routing system implements the route search method of the present invention by searching for the cost effective virtual links that connect boundary nodes of the clusters in a lower level for determining an optimum route between a start point and an end point. The cost of each virtual link is calculated based on predetermined parameters and dynamic parameters (ex. information regarding current traffic condition, etc.) and compared with the costs of other virtual links to select the cost effective virtual links.

Figure 12A:
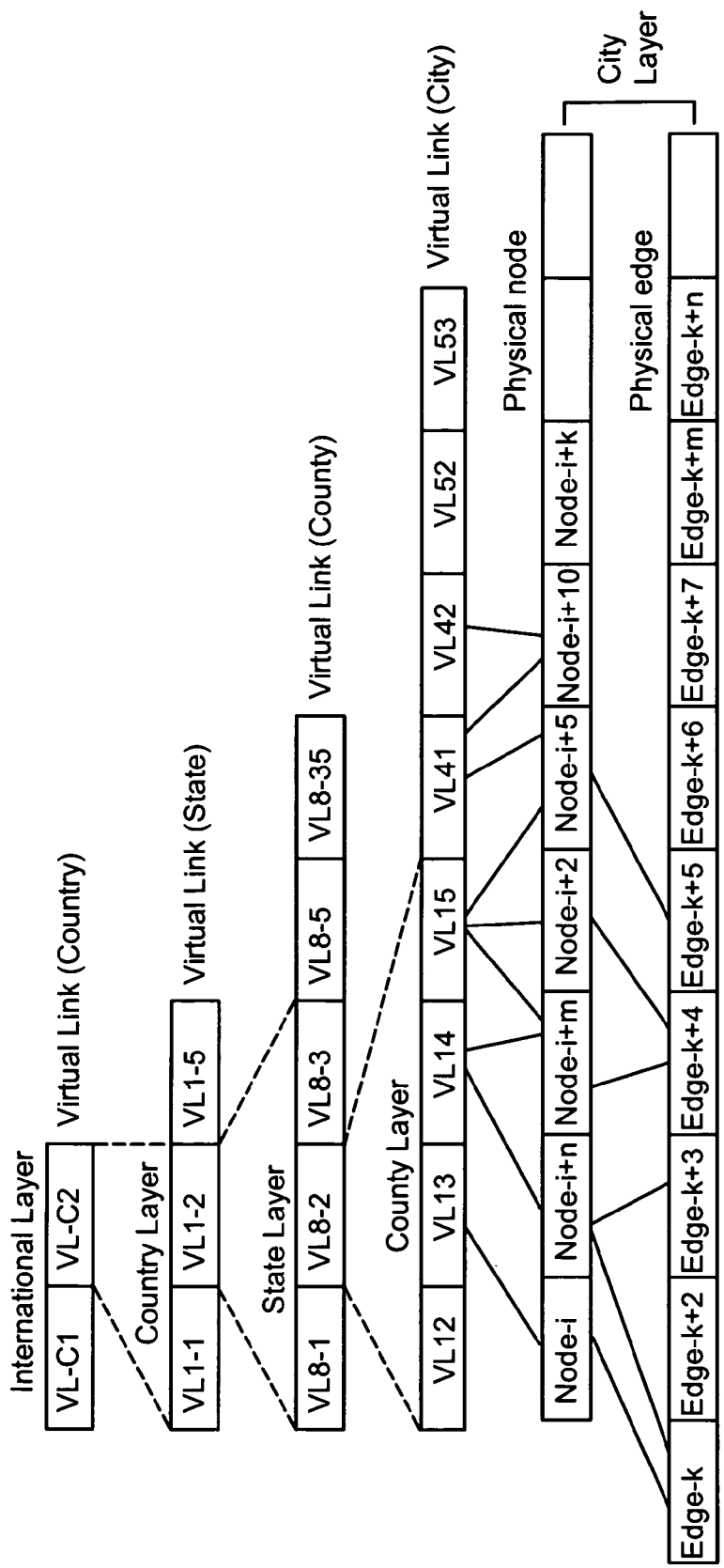

FIG. 12A is a schematic diagram showing a basic concept and structure of the multi-layer hierarchy routing system of the present invention which evaluates the costs involved in virtual links connecting the boundary nodes for finding an optimum route between a start point and a destination. In the example of FIG. 12A, the multi-layer hierarchy routing system is configured by an international layer for selecting routes between countries, a country layer for selecting routes between states within the selected country, a state layer for selecting routes between counties within the selected state, and a county layer for selecting routes between cities within the selected county.

The multi-layer hierarchy routing system further includes a city layer which has a physical node layer and a physical edge layer for selecting and connecting routes within the selected city. This process for selecting and connecting the routes within the city, i.e., the lowest layer, is made through a combination of the conventional algorithm and a cost space determined based on various factors as well as dynamic information reflecting current and estimated traffic condition, etc. As noted above with reference to FIGS. 6-11, each of the layers (from international to county layers) includes cost table with respect various virtual links for connecting the boundary nodes of the administrative regions in the lower layer.

Figure 14:
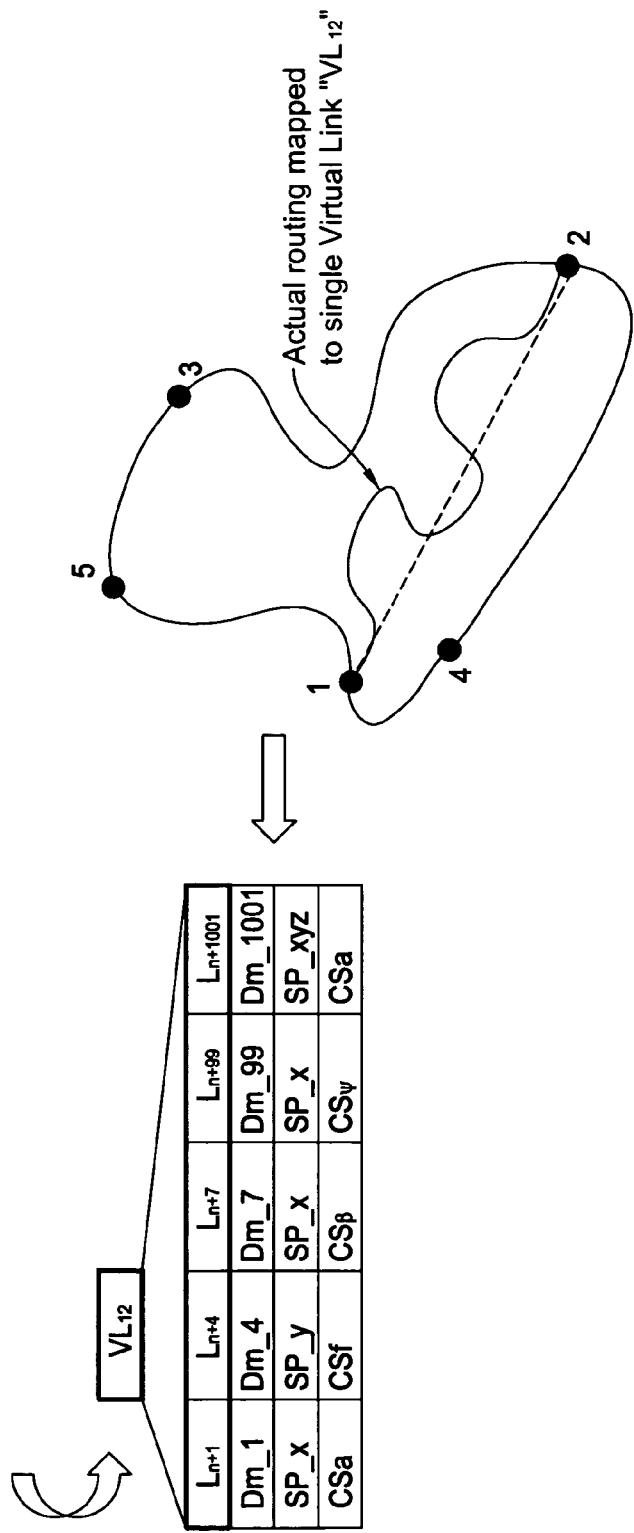
FIG. 14 is a schematic diagram showing an example of cost tables with respect to virtual links of a higher level for evaluating an overall cost of each virtual link connecting the boundary nodes based on distances, speeds, and other factors, thereby determining an optimum route between the boundary nodes of the administrative region.

Namely, the top layer (international layer) of scheme knows or has information of the preferred routing path of how to drive through a country to another country by employing boundary nodes and virtual links with respect to the countries. Typically, such information is organized in a manner of cost table which lists link costs of virtual links as shown in FIGS. 13 and 14. As noted above, the cost of each virtual link is determined by a distance, travel time, as well as cost space which includes various factors such as traffic conditions.

The second layer of the scheme, which is a country layer, has a cost table with respect to virtual links connecting the boundary nodes of the country or the states within the country (ex. U.S.), for example, between the states of California and Oregon. The third layer of the scheme, which is a state layer, has a cost table with respect to virtual links connecting the boundary nodes of the state or the counties within the state (ex. California), for example, between the counties of Orange and Riverside. The fourth layer of the scheme, which is a county layer, has a cost table with respect to virtual links connecting the boundary nodes of the county or the cities within the selected county (ex. Orange county), for example, between the cities of Newport Beach and Santa Ana.

The cost table in each layer is pre-computed upon cost models using boundary nodes for optimal routing path based on administration geo-coding, address vehicle location and its destination by administration hierarchy levels. Further, the values in the cost tables may vary dynamically upon changes of traffic conditions such as traffic accidents, constructions, traffic jams, as well as weather conditions, etc. No matter which administration hierarchy level is targeted, the same algorithm is employed in each layer except for the base layer (lowest level road network, i,e, the city layer).

Figure 12B:
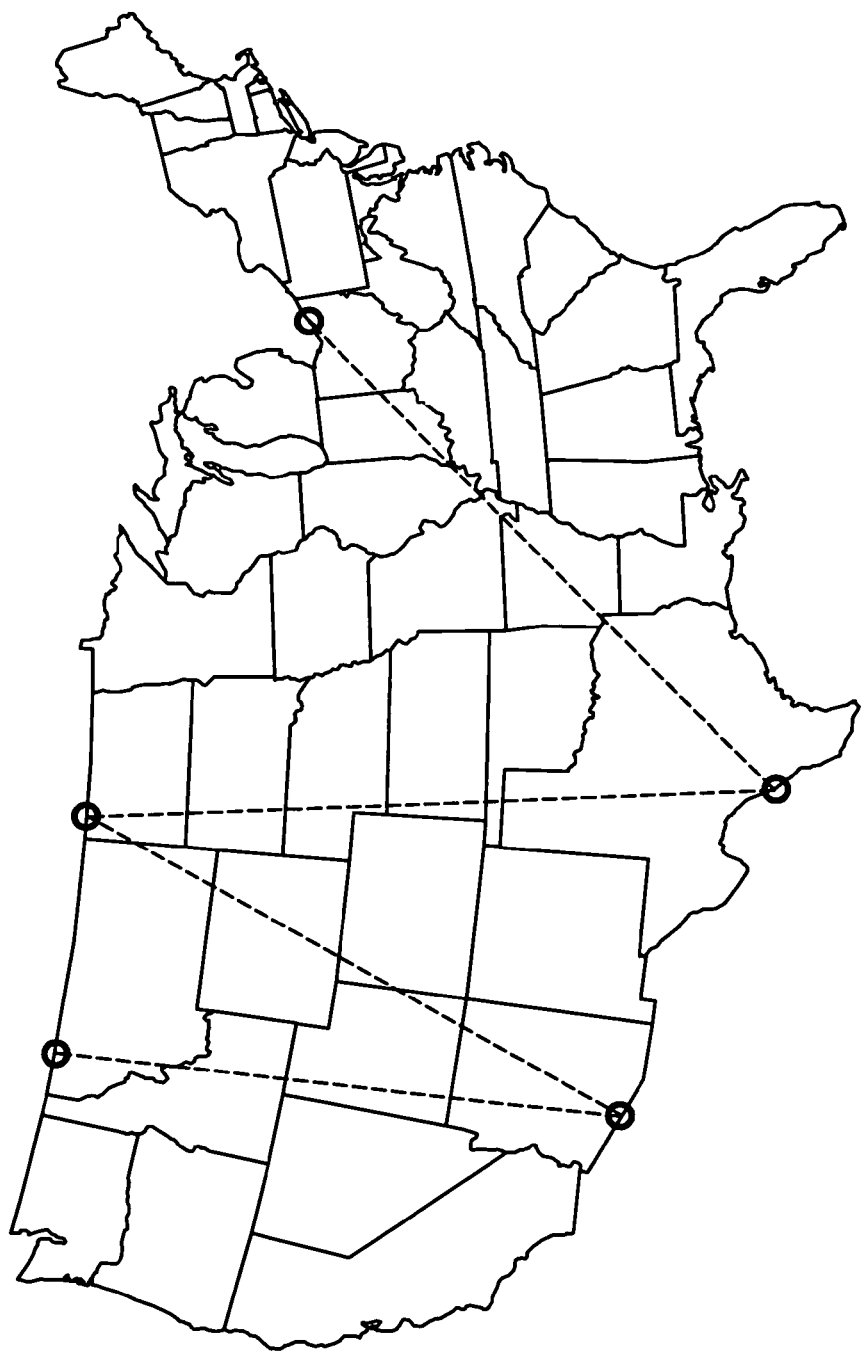

FIG. 12B is a schematic diagram showing the operation of the multi-layer hierarchy routing system for finding the route in the country layer. The boundary nodes of the country U.S. are denoted by circles while virtual links connecting the boundary nodes are denoted by dotted lines. FIG. 12C is an example of XML descriptions of the route search corresponding to virtual links shown in FIG. 12B.

Figure 12D:
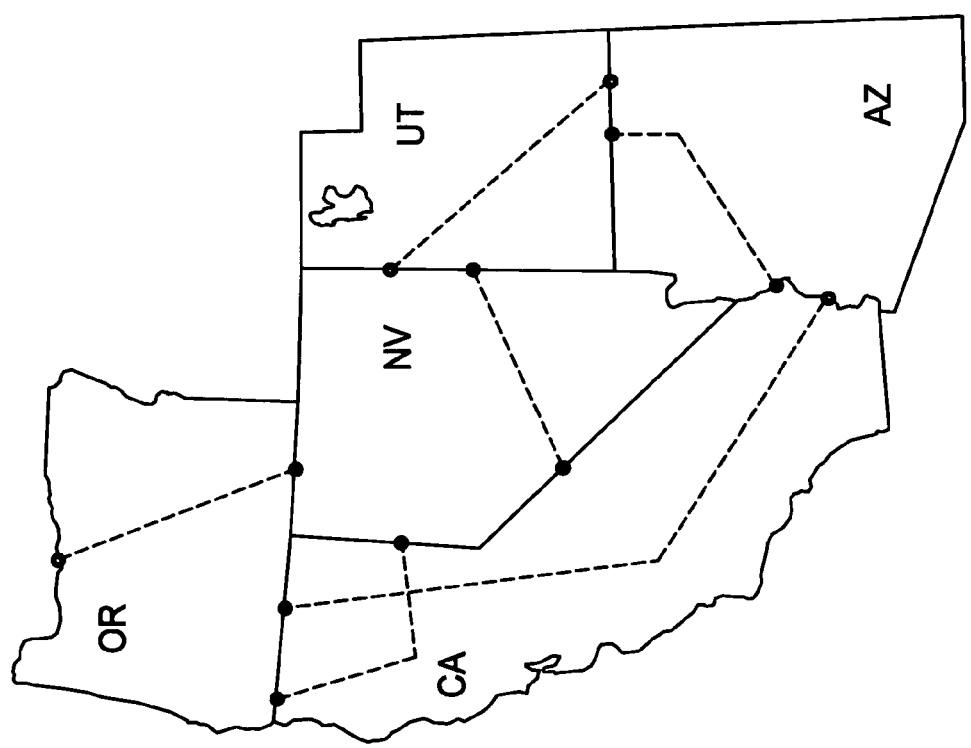

FIG. 12D is a schematic diagram showing the operation of the multi-layer hierarchy routing system for finding the route in the state layer. The boundary nodes of the several states within the U.S. are denoted by circles while virtual links connecting the boundary nodes of the states are denoted by dotted lines. FIG. 12E is an example of XML descriptions of the route search corresponding to the virtual links shown in FIG. 12D.

FIG. 13 is a schematic diagram showing an example of cost tables involved in the virtual links of a higher level and the physical links of a base level. The cost table includes pre-computed data for evaluating an overall cost of each virtual link connecting the boundary nodes based on distances, speeds, and other factors to determine an optimum route between a start point and a destination. In the higher level, from the international to county layers shown in FIG. 12A, the cost table lists values of virtual links connecting boundary nodes of lower layer in terms of distance, travel time, as well as cost space factors which include, for example, traffic condition, traffic regulation, vehicle type, etc.

In the example of FIG. 13, in the higher level, the cost table includes a distance table, a travel time table, and a virtual link table where each table shows boundary nodes BN-1, BN-2, . . . BN-5. The distance table lists distance values D12, D13, etc., between two corresponding boundary nodes, and the travel time table lists values T12, T13, etc., of travel time between two corresponding boundary nodes. The virtual link table lists names of virtual links VL12, VL13, etc., each connecting the two corresponding boundary nodes. In the base level, which is typically a city level, is directed to the costs of physical links, the navigation system calculates an optimum route through a traditional manner as well as incorporating the cost space factors of the present invention.

FIG. 14 is a schematic diagram showing an example of cost tables involved in the virtual links of the higher level corresponding to that of FIG. 13. The example of FIG. 14 includes a virtual link weight (cost) table which is derived from the distance table, travel time table, and virtual link table shown in FIG. 13 for evaluating an overall cost of each virtual link connecting the boundary nodes. In addition to the distance value and travel time value for each virtual link, the virtual link weight table further includes values of cost space (VCS) factors including traffic condition, time of a day, seasonal factor, vehicle type, type of road, etc.

The lower table in FIG. 14 shows further details of costs involved in a virtual link which is mapped to actual routes where each actual route is also provided with the distance value, travel time values and cost space value. In this example, the virtual link VL12 that connects the boundary nodes 1 and 2 shown in the map at the right side of FIG. 14 is broken into details of cost value. Namely, the lower table of FIG. 14 lists the data regarding the distance value, travel time values and cost space value of each of the actual links Ln+1, Ln+4, etc. that constitute the virtual link VL12.

Figure 15:
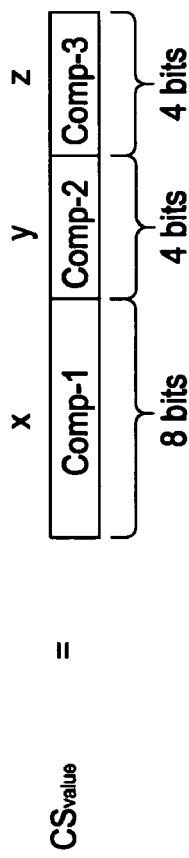
FIG. 15 is a schematic diagram showing an example of various parameters involved in the cost space factors shown in FIGS. 13 and 14 for evaluating the overall cost of each virtual link connecting the boundary nodes.

FIG. 15 is a schematic diagram showing an example of various parameters involved in the cost space factors CSa of each link (ex. Ln+1) shown in FIG. 14 for evaluating the overall cost of each virtual link connecting the boundary nodes. In this example, parameters (attributes) representing the cost space factors are listed in the table which include "seasonal", "construction", "traffic law", "time", "vehicle type", "toll/gate", and "dynamic information". Further, each attribute is classified into different components which are "component 1", "component 2", and "component 3". It should be noted that although the table of FIG. 15 shows letters of x, y, z, and c for simplicity, in the actual application, numerical values are provided instead of letters x, y, z, and c, where the value c is derived from the values x, y, and z.

In the example of FIG. 15, the attribute "seasonal" is directed to a condition of road that will be affected by season of year such as a sightseeing season, the attribute "construction" is directed to a specific structure of a road such as a one-way road, the attribute "traffic law" is directed to a specific traffic rule applied to a road such as a speed limit, the attribute "time" is directed to a time of a day such as a rush hour, the attribute "vehicle type" is directed to a type of a car in terms of size and speed, the attribute "toll/gate" is directed to the fee to use a particular road, and the attribute "dynamic information" is typically directed to the current traffic condition, such as traffic accidents, lane closure, weather conditions, etc. that will be changed dynamically.

Further, in the cost space factor table of FIG. 15, the above attributes are valued by different components 1-3 for more accurately evaluate the cost of the route. The component 1 is directed to a speed so that the values for the corresponding attributes are assigned based on evaluation of speed, the component 2 is directed to a type of area such as a scenic area, downtown, etc., and the component 3 is directed to an angle and elevation of an area such as a road on a high mountain. The values of components 1, 2, and 3 are denoted by the letters x, y, z, respectively in the table where the cost space value c is a sum of x, y and z. As an example, the component 1 has the highest weight which is expressed by 8 bits while the component 2 and component 3 have the lower weight each of which is expressed by 4 bits. In the practical application, the cost factors c-a1, c-a2, c-a3, . . . for each link are averaged, for example, by a root-means-square (RMS) method, for calculating an overall cost space of each link.

Figure 16:
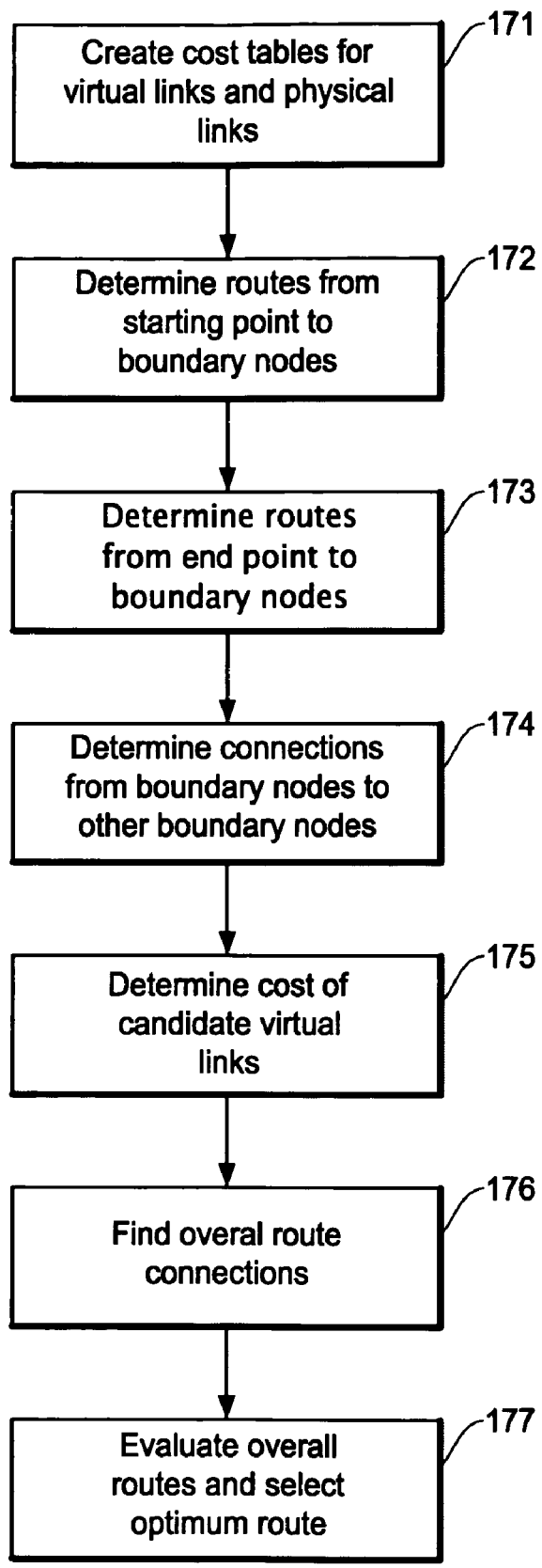
FIG. 16 is a flow chart showing an example of overall operational steps for searching an optimum route in the route search method of the present invention utilizing the XML map data in the layered form where each layer is configured by administrative clusters.

FIG. 16 is a flow chart showing the overall steps of searching an optimum route in the route search method under the present invention. In step 171, the cost tables as shown in FIGS. 13-15 are created for the virtual links that connect the boundary nodes of administrative regions in the higher layer of map data and physical links of base layer. As noted above, the values in the cost tables are computed based on distances, travel times, and predetermined cost space factors for each virtual link and physical link.

As the user inputs a destination, the route search method under the present invention will determine a route between the start point to candidate boundary nodes of an administrative region (ex., a city) Str to which the start point belongs in step 172. Typically, at the same time, the process also determines a route between the destination point to candidate boundary nodes of an administrative region (ex., a city) Dst to which the destination belongs in step 173 since the route search proceeds from the both ends of the route.

Then, in step 174, the route search process will determine connections (virtual links) from the boundary nodes of the administrative region Str to the boundary nodes of the administrative region Dst. If the administrative region Str and the administrative region Dst belong to counties or states different from one another, boundary nodes of the county level or the state will be examined to find connections (virtual links) between those boundary nodes based on the multi-layered system shown in FIGS. 3-5 and 12A. In this step, the route search method retrieves candidate connections between candidate boundary nodes based on the numerical values in the pre-computed cost table such as shown in FIGS. 13 and 14 which lists all possible virtual links and costs.

Then, the cost of each candidate connection (virtual link) is determined in step 175 based on the values provided in the cost table which also reflect the dynamic information such as current traffic conditions, weather conditions, etc. The costs of the virtual links are compared to select an optimum link in terms of efficiency, i.e., a link of the lowest cost. When comparing the cost of the virtual links, the process evaluates the costs of the actual links corresponding to the virtual links by breaking down the virtual link to the physical links and their costs as shown in the lower table of FIG. 14.

As the search method finds best combination of connections (virtual links) for the boundary nodes, it will find the overall route connections from the start point to the destination in step 176. As the boundary nodes and their connections are determined, an optimum route is determined in step 177 by replacing the virtual links with the physical links and evaluating the overall costs of the overall connections. Thus, the route search process ends, and the navigation system is able to start the route guidance operation to the destination.

Figure 17:
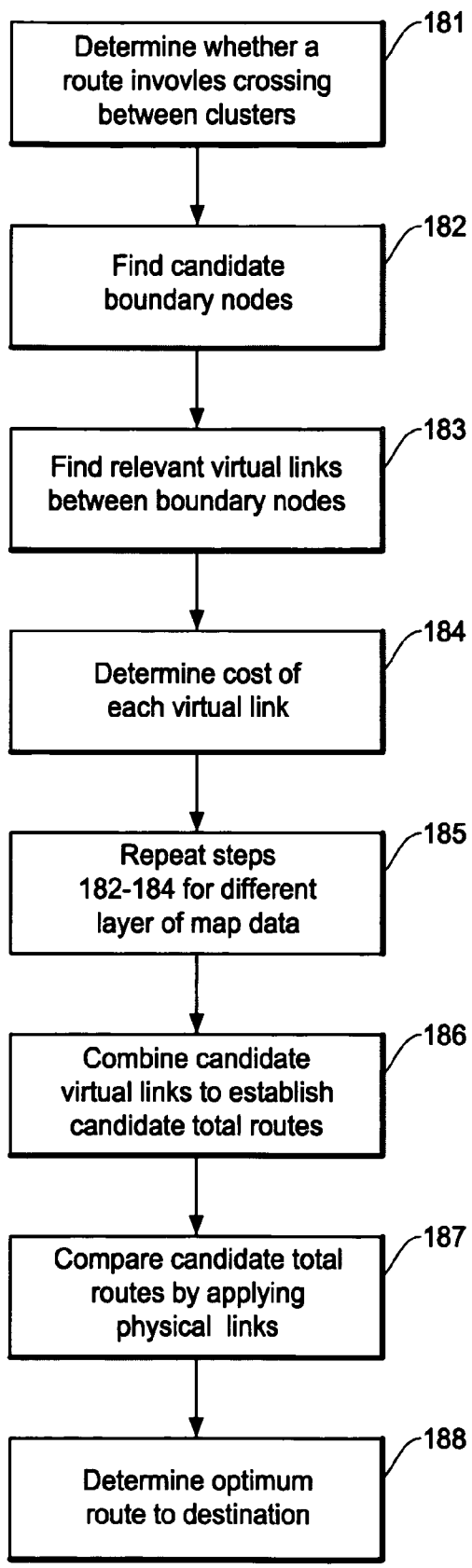
FIG. 17 is a flow chart showing another example of operational steps for searching an optimum route in the route search method of the present invention utilizing the XML map data in the layered form where each layer is configured by administrative clusters.

FIG. 17 is a flow chart showing an example of another operational process for finding an optimum route involving the virtual links connecting the candidate boundary nodes under the present invention. This procedure is described in conjunction with a schematic view of FIG. 18 that describes candidate boundary nodes and the route connections using the boundary nodes. In the first step 181, the process determines whether a route would involve crossing between administrative clusters, i.e., whether the start point and the destination are located in different administrative regions.

Figure 18:
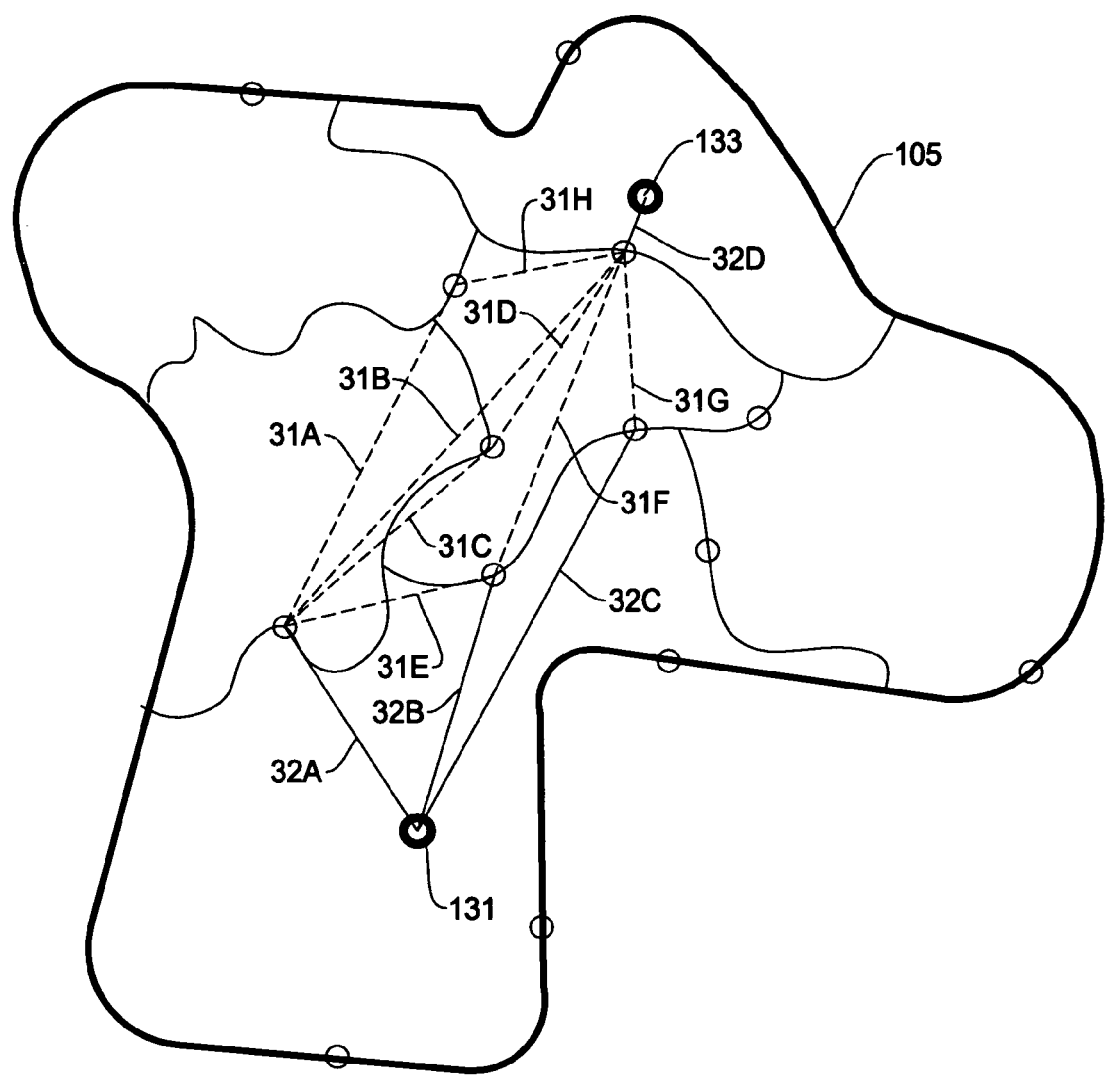
FIG. 18 is a schematic diagram showing the candidate boundary nodes of administrative clusters within a higher level administrative cluster for determining an optimum route via the boundary nodes.

As noted above, within the context of the present invention, the administrative regions (clusters) are cities, counties, states, or countries. In the example of FIG. 18, the boundary represented by a thick line is a county boundary 105 while smaller regions with boundaries represented by thin lines within the county boundary 105 are cities. A start point 131 is located in one city while a destination point 133 is located in another city within the same county boundary 105.

Then, in step 182, the route search method will find candidate boundary nodes of the city having the start point and the city having the destination point. Next, the route search method will find relevant connections, i.e., virtual links, between the candidate boundary nodes in step 183. In FIG. 18, the connections (virtual links) between the candidate boundary nodes are represented by dotted lines. In this example, the connections 31A to 31H are virtual links connecting the candidate boundary nodes. Connections between the starting point 131 to boundary nodes are represented by solid lines 32A, 32B, and 32C and a connection between the destination point 133 to a boundary node is also represented by a solid line 32D.

Next, the costs of the connections (virtual links) are determined at step 184 by the cost table that is provided to the higher layer of map data. As noted above, with reference to FIGS. 5-11 and 12A, the cost table provided to the higher layer shows costs of all virtual links connecting the boundary nodes within the administrative region. For example, the map data indicating a particular county includes cost table for all of virtual links connecting the boundary nodes of the cities within the county and the virtual links connecting the boundary nodes of the county itself.

With respect to FIG. 18, for instance, the connection 31A has the cost value of 9, the connection 31B has the cost value of 13, the connection 31C has the cost value of 8, etc. The smaller numerical value of the cost indicates that the virtual link is a more efficient link. In step 185, the process repeats the foregoing steps 182-184 for virtual links of different layer of the map data, for example, on the state layer, country layer, etc. to retrieve candidate virtual links for establishing total routes.

The route search method will then combine the retrieved candidate virtual links to establish candidate total routes in step 186. For example, a total route by the connection combination (1) of the virtual links 32B, 31F and 32D completes one candidate route between the start point 131 and the destination point 133. Similarly, another total route by the connection combination (2) of the virtual links 32A, 31C, 31D, and 32D also forms another candidate route between the start point 131 and the destination point 133. As apparent from the schematic view of FIG. 18, several other combinations are also possible.

The route search method will compare the candidate routes to find an optimum route in step 187 by applying cost data in the base level (physical links). That is, the costs of the candidate total routes are broken down to the details of the base level in the manner shown FIGS. 13 and 14 and are compared with one another to find a route with the lowest cost. For example, if the cost reflecting the physical links of the connection 32D is 3, the cost of the connection 31F is 11, and the cost of the connection 32B is 8, then the total cost of the combination (1) is the sum of those connections, which is 22. Similarly, if the cost reflecting the physical links of the connection 32A is 6, the cost of the connection 31C is 8, the cost of the connection 31D is 7, and the cost of the connection 32D is 3, then the total cost of the combination (2) is 24.

Thus, in the above example, the candidate route by the combination (1) has the lower overall cost 22 than the candidate route by the combination (2) with the overall cost 24. The route search method will perform comparison in the similar manner for all of the candidate connections. Thus, in step 188, the route search method of the present invention determines an optimum route between the start point to the destination by selecting the candidate route of the lowest cost.

FIG. 19 is a block diagram showing an example of structure of a vehicle navigation system for implementing the route search method of the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 231 such as a hard disc, CD-ROM, DVD or other storage means for storing the map data in the XML format. The map data is constructed in the multiple layer structure where the higher layer includes cost tables for all of virtual links connecting the boundary nodes of the administrative regions (clusters) in the lower layer. The navigation system further includes a control unit 232 for controlling an operation for reading the information from the data storage medium 231, and a position measuring device 233 for measuring the present vehicle position or user position. For example, the position measuring device 233 has a vehicle speed sensor for detecting a moving distance, a gyroscope for detecting a moving direction, a microprocessor for calculating a position, a GPS (global positioning system) receiver for receiving GPS signals from satellites, and etc.

The block diagram of FIG. 19 further includes a map information memory 234 for storing the map information which is read from the data storage medium 231, a database memory 235 for storing database information such as point of interest (POI) information which is read out from the data storage medium 231, a remote controller (input device) 237 for executing a menu selection operation, an enlarge/reduce operation, a destination input operation, map scrolling operation, etc. and a remote controller interface 238. Although a remote controller is a typical example of the input device for selecting menus, executing selected functions and etc., the navigation system includes various other input methods to achieve the same and similar operations done through the remote controller.

In FIG. 19, the navigation system further includes a bus 236 for interfacing the above units in the system, a processor (CPU) 239 for controlling an overall operation of the navigation system, a ROM 240 for storing various control programs such as a route search program and a map matching program necessary for navigation control, a RAM 241 for storing a processing result such as a guide route, a display controller 243 for generating map image (a map guide image and an arrow guide image) on the basis of the map information, a VRAM 244 for storing images generated by the display controller 243, a menu/list generating unit 245 for generating menu image/various list images, a synthesizing unit 246, a wireless transceiver 249 for wireless communication, a buffer memory 248 for storing data, and a monitor (display) 250.

The processor (CPU) 239 controls the overall operation of the route search method of the present invention by evaluating the costs of virtual links and physical links, establishing total routes by connecting the virtual links, and selecting the most cost effective route. The wireless transceiver 249 retrieves data such as traffic incident information and weather information, etc., from a remote server to determine the dynamic information for the cost space of the links. The buffer memory 248 stores data such as the traffic incident information, weather information, etc., for evaluation of the costs of the virtual links, physical links, etc.

As has been described above, according to the present invention, the navigation system is able to efficiently search a route between a start point to a destination for a navigation system utilizing XML map data with a layered structure which is configured by units of administrative regions. The navigation system searches a route between the start point and the destination by evaluating costs of virtual links that connect boundary nodes of the administrative regions on higher layers and costs of physical links on a base layer of the map data. The navigation system determines the most cost effective route by evaluating costs of virtual links and physical links where the costs are computed based on distances, travel times, and cost space factors with various attributes.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of searching a route between a start point to a destination point for a navigation system utilizing XML map data, comprising the following steps of:

evaluating the XML map data stored in a data storage device and establishing boundary nodes on boundaries of administrative regions represented by the XML map data, said administrative regions are arranged by a layered structure in the XML map data;

creating cost information on virtual links that connect the boundary nodes on the administrative regions on layers higher than a base layer in the layered structure of the XML map data and storing the cost information on the virtual links in the data storage device;

creating cost information on physical links on the base layer of the layered structure of the XML map data and storing the cost information on the physical links in the data storage device;

searching routes, under control of a processor of the navigation system, by evaluating the XML map data with the cost information, between a start point and boundary nodes of an administrative region to which the start point belongs and searching routes between a destination point set to the navigation system via an input device and boundary nodes of an administrative region to which the destination point belongs;

selecting candidate virtual links that connect the boundary nodes of different administrative regions on a particular layer of the XML map data by evaluating the cost information on the virtual links under the control of the processor of the navigation system;

detecting candidate total routes between the start point and the destination point, under the control of the processor of the navigation system, by connecting the candidate virtual links and the routes between the start point and the destination point to the boundary nodes of the corresponding administrative regions; and applying physical links in the base layer of the map data to the candidate total routes, under the control of the processor of the navigation system, for further evaluating costs of the total routes to select the most cost effective total route;

wherein the cost information is established on each of said administrative region layer of the XML map data, and the cost information on the virtual links on a particular administrative region layer is included in an administrative region layer of the XML map data that is immediately higher than the particular administrative region layer in a form of cost tables.

2. A method of searching a route as defined in claim 1, further comprising, under the control of the processor of the navigation system, a step of repeating the step of selecting the candidate virtual links corresponding to a layer of the XML map data different from said particular layer to detect candidate total routes for detecting the candidate total routes.

3. A method of searching a route as defined in claim 1, wherein the boundary nodes on the administrative regions in the XML map data are nodes of physical links establishing roads at the boundaries of the administrative regions.

4. A method of searching a route as defined in claim 1, wherein the cost information is computed based on a distance, a travel time, and predetermined cost space factors for each virtual link and physical link.

5. A method of searching a route as defined in claim 4, wherein said predetermined cost space factors for each virtual link and physical link are numerical values assigned to different attributes that affect the costs where the attributes include a season of a year, a time of a day, a structure of a road, traffic law, and a vehicle type.

6. A method of searching a route as defined in claim 5, wherein said predetermined cost space factors for each virtual link and physical link are numerical values assigned to different attributes that affect the costs where the attributes include traffic conditions and weather condition related to particular links that change dynamically.

7. A method of searching a route as defined in claim 6, wherein the overall cost related to the cost space factors for each virtual link and physical link is determined by averaging the numerical values assigned to different attributes through a root-means-square method.

8. A method of searching a route as defined in claim 1, wherein said administrative regions include cities, counties, states, and countries in the order of lower layer to higher layer in the layered structure of the XML map data.

9. A method of searching a route as defined in claim 8, wherein the layered structure of the XML map data is configured by an international layer for connecting the boundary nodes between two or more countries, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

10. A method of searching a route as defined in claim 8, wherein the layered structure of the XML map data is configured by a freeway backbone layer having physical links and nodes for connecting the freeway to nodes on other layers, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

11. A navigation system for searching a route between a start point to a destination point utilizing XML map data and guiding a user to the destination point via the searched route, comprising:

a data storage device which stores the XML map data related to determining a preferable route between a start point and a destination point;

an input device for selecting operational menus of the navigation system and specifying a destination point for a route guidance operation to the destination point;

a processor for controlling overall operations of the navigation system in a route search process and a route guidance process;

wherein the processor controls the following operations of the navigation system:

evaluating the XML map data stored in the data storage device and establishing boundary nodes on boundaries of administrative regions represented by the XML map data, said administrative regions are arranged by a layered structure in the XML map data;

creating cost information on physical links on the base layer of the layered structure of the XML map data and storing the cost information on the physical links in the data storage device;

creating cost information on physical links on the base layer of the layered structure of the XML map data and storing the cost information on the physical links in the data storage device;

searching routes by evaluating the XML map data with the cost information, between a start point and boundary nodes of an administrative region to which the start point belongs and searching routes between a destination point set to the navigation system via the input device and boundary nodes of an administrative region to which the destination point belongs;

selecting candidate virtual links that connect the boundary nodes of different administrative regions on a particular layer of the XML map data by evaluating the cost information on the virtual links under the control of the processor of the navigation system;

detecting candidate total routes between the start point and the destination point, under the control of the processor of the navigation system, by connecting the candidate virtual links and the routes between the start point and the destination point to the boundary nodes of the corresponding administrative regions; and applying physical links in the base layer of the map data to the candidate total routes for further evaluating costs of the total routes to select the most cost effective total route;

wherein the cost information is established on each of said administrative region layer of the XML map data, and the cost information on the virtual links on a particular administrative region layer is included in an administrative region layer of the XML map data that is immediately higher than the particular administrative region layer in a form of cost tables.

12. A navigation system as defined in claim 11, wherein said processor further controls an operation of repeating the function of selecting the candidate virtual links corresponding to a layer of the XML map data different from said particular layer to detect candidate total routes for detecting the candidate total routes.

13. A navigation system as defined in claim 11, wherein the boundary nodes on the administrative regions in the XML map data are nodes of physical links establishing roads at the boundaries of the administrative regions.

14. A navigation system as defined in claim 11, wherein the cost information is computed based on a distance, a travel time, and predetermined cost space factors for each virtual link and physical link.

15. A navigation system as defined in claim 14, wherein said predetermined cost space factors for each virtual link and physical link are numerical values assigned to different attributes that affect the costs where the attributes include a season of a year, a time of a day, a structure of a road, traffic law, and a vehicle type.

16. A navigation system as defined in claim 15, wherein said predetermined cost space factors for each virtual link and physical link are numerical values assigned to different attributes that affect the costs where the attributes include traffic conditions and weather condition related to particular links that change dynamically.

17. A navigation system as defined in claim 16, wherein the overall cost related to the cost space factors for each virtual link and physical link is determined by averaging the numerical values assigned to different attributes through a root-means-square method.

18. A navigation system as defined in claim 11, wherein said administrative regions include cities, counties, states, and countries in the order of lower layer to higher layer in the layered structure of the XML map data.

19. A navigation system as defined in claim 18, wherein the layered structure of the XML map data is configured by an international layer for connecting the boundary nodes between two or more countries, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

20. A navigation system as defined in claim 18, wherein the layered structure of the XML map data is configured by a freeway backbone layer having physical links and nodes for connecting the freeway to nodes on other layers, a country layer for connecting the boundary nodes between two or more states within the country, a state layer for connecting the boundary nodes between two or more counties within the state, a county layer for connecting the boundary nodes between two or more cities within the county, and a city layer which is the base layer with the physical links.

* * * * *